US011939864B2

(12) United States Patent
Ruhle et al.

(10) Patent No.: US 11,939,864 B2
(45) Date of Patent: Mar. 26, 2024

(54) CLUSTER EFFICIENCY OPERATION CONTROL

(71) Applicant: HALLIBURTON ENERGY SERVICES, INC., Houston, TX (US)

(72) Inventors: William Owen Alexander Ruhle, Denver, CO (US); Ronald Glen Dusterhoft, Katy, TX (US); Ajish Potty, Missouri City, TX (US); Joshua Lane Camp, Friendswood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 382 days.

(21) Appl. No.: 17/064,366

(22) Filed: Oct. 6, 2020

(65) Prior Publication Data

US 2021/0231835 A1 Jul. 29, 2021

Related U.S. Application Data

(60) Provisional application No. 62/965,698, filed on Jan. 24, 2020.

(51) Int. Cl.
*E21B 49/00* (2006.01)
*E21B 43/26* (2006.01)
(Continued)

(52) U.S. Cl.
CPC ............ *E21B 49/005* (2013.01); *E21B 43/26* (2013.01); *E21B 43/2607* (2020.05);
(Continued)

(58) Field of Classification Search
CPC .... E21B 49/005; E21B 43/26; E21B 43/2607; E21B 43/267; E21B 47/06; E21B 47/107;
(Continued)

(56) References Cited

U.S. PATENT DOCUMENTS

| 6,644,844 B2 | 11/2003 | Neal et al. |
| 8,886,502 B2 | 11/2014 | Walters et al. |

(Continued)

FOREIGN PATENT DOCUMENTS

| CN | 107203667 A | 9/2017 |
| WO | 2016086138 A1 | 6/2016 |

OTHER PUBLICATIONS

Mientka, Matthew, Romberg, Eric, and Ellen Scott. "A Novel Approach to Predicting Improvements in Perforation Cluster Treatment Efficiency." Paper presented at the SPE International Hydraulic Fracturing Technology Conference and Exhibition, Muscat, Oman, Oct. 2018. (Year: 2018).*

(Continued)

*Primary Examiner* — Steven W Crabb
*Assistant Examiner* — Troy A Maust
(74) *Attorney, Agent, or Firm* — NOVAK DRUCE CARROLL LLP

(57) ABSTRACT

Aspects of the subject technology relate to systems and methods for controlling a hydraulic fracturing job. Systems and methods are provided for receiving diagnostics data of a hydraulic fracturing completion of a wellbore, accessing a fracture formation model that models formation characteristics of fractures formed through the wellbore into a formation surrounding the wellbore during the hydraulic fracturing completion with respect to surface variables of the hydraulic fracturing completion, selecting one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations, and applying the fracture formation (Continued)

model based on the diagnostics data to determine values of the surface variables.

15 Claims, 12 Drawing Sheets

(51) Int. Cl.
| | |
|---|---|
| *E21B 43/267* | (2006.01) |
| *E21B 47/06* | (2012.01) |
| *E21B 47/107* | (2012.01) |
| *E21B 49/08* | (2006.01) |
| *G01V 1/22* | (2006.01) |
| *G01V 1/40* | (2006.01) |
| *G01V 20/00* | (2024.01) |
| *G06F 30/20* | (2020.01) |
| *E21B 47/07* | (2012.01) |
| *G06F 113/08* | (2020.01) |

(52) U.S. Cl.
CPC ............ *E21B 43/267* (2013.01); *E21B 47/06* (2013.01); *E21B 47/107* (2020.05); *E21B 49/00* (2013.01); *E21B 49/0875* (2020.05); *G01V 1/226* (2013.01); *G01V 1/40* (2013.01); *G01V 20/00* (2024.01); *G06F 30/20* (2020.01); *E21B 47/07* (2020.05); *E21B 2200/20* (2020.05); *G06F 2113/08* (2020.01)

(58) Field of Classification Search
CPC ...... E21B 49/00; E21B 49/0875; E21B 47/07; E21B 2200/20; E21B 2200/22; E21B 47/00; E21B 43/261; E21B 43/2605; E21B 43/27; E21B 49/087; E21B 47/006; E21B 33/00; G01V 1/226; G01V 1/40; G01V 99/005; G01V 1/288; G01V 2210/1234; G01V 2210/646; G06F 30/20; G06F 2113/08; G06F 30/25; G06F 30/27; G06F 30/28; G06F 2113/00–2113/28; G06F 30/00; G06F 30/17; G06F 30/18; G06F 30/23; G06F 30/30; G06F 30/327; G06F 30/33; G06F 30/3312; G06F 30/34; G06F 30/36; G06F 30/39; G06F 30/392; G06F 30/394

See application file for complete search history.

(56) References Cited

U.S. PATENT DOCUMENTS

| | | | |
|---|---|---|---|
| 10,329,888 | B2 | 6/2019 | Urbancic et al. |
| 10,570,704 | B2 | 2/2020 | Colvin et al. |
| 10,577,908 | B2 | 3/2020 | Kisra et al. |
| 10,605,060 | B2 | 3/2020 | Chuprakov et al. |
| 10,738,580 | B1 | 8/2020 | Fischer et al. |
| 10,760,416 | B2 | 9/2020 | Weng et al. |
| 10,851,633 | B2 | 12/2020 | Harper |
| 10,914,139 | B2 | 2/2021 | Shari et al. |
| 10,920,538 | B2 | 2/2021 | Rodriguez Herrera et al. |
| 10,920,552 | B2 | 2/2021 | Rodriguez Herrera et al. |
| 2007/0277982 | A1 | 12/2007 | Shampine et al. |
| 2011/0030963 | A1 | 2/2011 | Demong et al. |
| 2013/0140031 | A1 | 6/2013 | Cohen et al. |
| 2015/0176387 | A1 | 6/2015 | Wutherich |
| 2015/0204174 | A1 | 7/2015 | Kresse et al. |
| 2016/0108713 | A1 | 4/2016 | Dunaeva et al. |
| 2017/0051598 | A1 | 2/2017 | Quenes |
| 2017/0177992 | A1 | 6/2017 | Klie |
| 2017/0247995 | A1 | 8/2017 | Crews et al. |
| 2017/0328179 | A1 | 11/2017 | Dykstra et al. |
| 2018/0016895 | A1 | 1/2018 | Weng et al. |
| 2018/0230780 | A1 | 8/2018 | Klenner et al. |
| 2019/0071946 | A1 | 3/2019 | Painter et al. |
| 2019/0169962 | A1 | 6/2019 | Adnan et al. |
| 2019/0257977 | A1* | 8/2019 | Skalinski ................ G06F 30/20 |
| 2021/0010361 | A1 | 1/2021 | Kriebel et al. |
| 2021/0010362 | A1 | 1/2021 | Kriebel et al. |
| 2021/0131249 | A1* | 5/2021 | Singh ...................... E21B 43/14 |
| 2022/0228466 | A1* | 7/2022 | Watanabe ............... E21B 43/14 |

OTHER PUBLICATIONS

Wang, Shuhua, and Shengnan Chen. "Integrated well placement and fracture design optimization for multi-well pad development in tight oil reservoirs." (SpringerLink, 2018) Computational Geosciences 23, No. 3: 471-493. <https://link.springer.com/article/10.1007/s10596-018-9795-8> (Year: 2018).*

English abstract of CN107203667; retrieved from www.espacenet.com on Oct. 12, 2022.

International Search Report and Written Opinion for International application No. PCT/US2020/041836, dated Nov. 6, 2020, 10 pages.

* cited by examiner

CLUSTER EFFICIENCY OPERATION CONTROL

CROSS-REFERENCE TO RELATED APPLICATIONS

This application claims priority to U.S. Provisional Patent Application No. 62/965,698, filed on Jan. 24, 2020, entitled "HYDRAULIC FRACTURING MODELLING AND CONTROL," the contents of which are incorporated herein by reference in their entirety.

TECHNICAL FIELD

The present technology pertains to controlling a hydraulic fracturing completion of a wellbore based on completion characteristics of the completion, and more particularly, to selecting one or more completion plans from a plurality of completion plans based on cluster efficiency data and facilitating completion of the wellbore according to the one or more selected completion plans.

BACKGROUND

Completion of a wellbore through hydraulic fracturing is a complex process. The hydraulic fracturing process includes a number of different variables that can be altered to perform a well completion. Specifically, parameters related to perforation initiation and creation, e.g. through a plug-and-perf technique, can be altered during a hydraulic fracturing process to perform a well completion. Further, parameters related to fracture creation and stabilization can be altered during a hydraulic fracturing process to perform a well completion. Currently, fracturing jobs are performed by operators that rely heavily on their own knowledge and experience to complete a well. Hydraulic fracturing technologies have developed to provide real time fracturing data to operators performing a fracturing job. However, operators still rely on their own knowledge and experience to interpret this real time fracturing data and perform a well completion. This is problematic as operators are often unable to properly interpret the wealth of real time fracturing data that is gathered and provided to them in order to control a hydraulic fracturing job. Specifically, as the hydraulic fracturing process is complex and encompasses a number of different variables that can be altered to perform a well completion, it becomes difficult for operators to alter the variables of the hydraulic fracturing process based on real time fracturing data to properly control a hydraulic fracturing job. As a result, operators tend to rely more heavily on their own knowledge and experience instead of real time fracturing data to control a hydraulic fracturing process, often leading to detrimental effects on a well completion job.

BRIEF DESCRIPTION OF THE DRAWINGS

In order to describe the manner in which the features and advantages of this disclosure can be obtained, a more particular description is provided with reference to specific embodiments thereof which are illustrated in the appended drawings.

Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
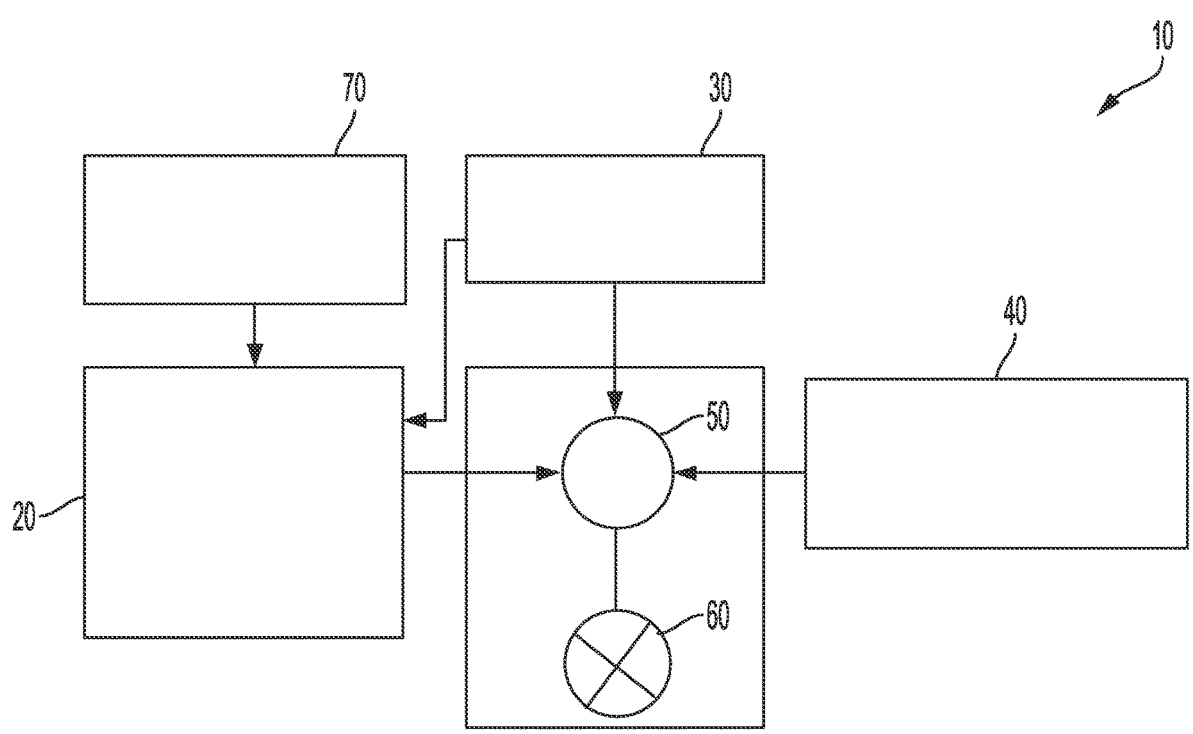
FIG. 1 shows an example schematic diagram of a fracturing system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation is made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the cased volume of the well, the amount of fluid that fills the fracture, and the amount of fluid that leaks-off into the formation during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled or partly filled with proppant to stabilize the fractures.

This process can be repeated in a plurality of fracturing stages to form a plurality of fractures through a wellbore, e.g. as part of a well completion phase. In particular and as will be discussed in greater detail later, this process can be repeatedly performed through a plug-and-perf technique to form the fractures throughout a subterranean formation. After the fractures are formed, resources, e.g. hydrocarbons, can be extracted from the fractures during a well production phase.

The hydraulic fracturing process includes a number of different variables, e.g. surface variables, that can be altered to perform a well completion. However, it is very difficult to control these variables and achieve a desired fracture geometry design for the completion. Specifically, it is difficult to control the large number of surface variables of a hydraulic fracturing completion, e.g. in real time, to cause actual fracture geometries and growth behaviors to converge on planned fracture geometries and growth behaviors. More specifically and because of the large number of variables that can be manipulated for controlling fracture geometries and growth behaviors, it is difficult for a human operator to control such variables, e.g. in real time, to cause actual fracture geometries and growth behaviors to converge on planned fracture geometries and growth behaviors.

In planning a hydraulic fracturing completion for a reservoir asset, the reservoir can be divided into geometric spacing units that delineate hydrocarbon drainage patterns for each wellbore. Fracture geometry designs can then be planned based on the spacing units. Upon finishing of the fracture geometry design, wellbores can be drilled and completed within those spacing unit with the intent of creating fractures that connect reservoir across the spacing units. However, geological discontinuity within and across the spacing units can cause large variations in fracture geometries and growth behaviors during well completion. In turn, this can make it more difficult to control the large number of variables of a hydraulic fracturing completion, e.g. in real time, to cause actual fracture geometries and growth behaviors to converge on planned fracture geometries and growth behaviors.

The disclosed technology addresses the foregoing by selecting one or more subsurface objective functions for a hydraulic fracture completion of a wellbore. In turn, variables of the completion can be selected for controlling fracture formation characteristics during the completion to converge on the one or more subsurface objective functions.

In various embodiments, a method for conducting a hydraulic fracturing job on a plurality of wellbores in a subterranean formation can include receiving diagnostics data of a hydraulic fracturing completion of a wellbore. The method can further include accessing a fracture formation model that models formation characteristics of fractures formed through the wellbore into a formation surrounding the wellbore during the hydraulic fracturing completion with respect to surface variables of the hydraulic fracturing completion. The method can also include selecting one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations. Furthermore, the method can include applying the fracture formation model based on the diagnostics data to determine values of the surface variables for controlling the formation characteristics of the fractures to converge on the one or more subsurface objective functions.

In various embodiments, a system for conducting a hydraulic fracturing job on a plurality of wellbores in a subterranean formation can include one or more processors; and at least one computer-readable storage medium having stored therein instructions which, when executed by the one or more processors, cause the system to receive diagnostics data of a hydraulic fracturing completion of a wellbore. The instructions can further cause the system to access a fracture formation model that models formation characteristics of fractures formed through the wellbore into a formation surrounding the wellbore during the hydraulic fracturing completion with respect to surface variables of the hydraulic fracturing completion. Furthermore, the instructions can cause the system to select one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations. Also, the instructions can cause the system to apply the fracture formation model based on the diagnostics data to determine values of the surface variables for controlling the formation characteristics of the fractures to converge on the one or more subsurface objective functions.

In various embodiments, a non-transitory computer-readable storage medium comprising instructions stored on the non-transitory computer-readable storage medium, the instructions, when executed by one or more processors, cause the one or more processors to receive diagnostics data of a hydraulic fracturing completion of a wellbore. The instructions can further cause the one or more processors to access a fracture formation model that models formation characteristics of fractures formed through the wellbore into a formation surrounding the wellbore during the hydraulic fracturing completion with respect to surface variables of the hydraulic fracturing completion. Furthermore, the instructions can further cause the one or more processors to select one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations. Also, the instructions can further cause the one or more processors to apply the fracture formation model based on the diagnostics data to determine values of the surface.

Turning now to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. As will be discussed in greater detail later, the additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
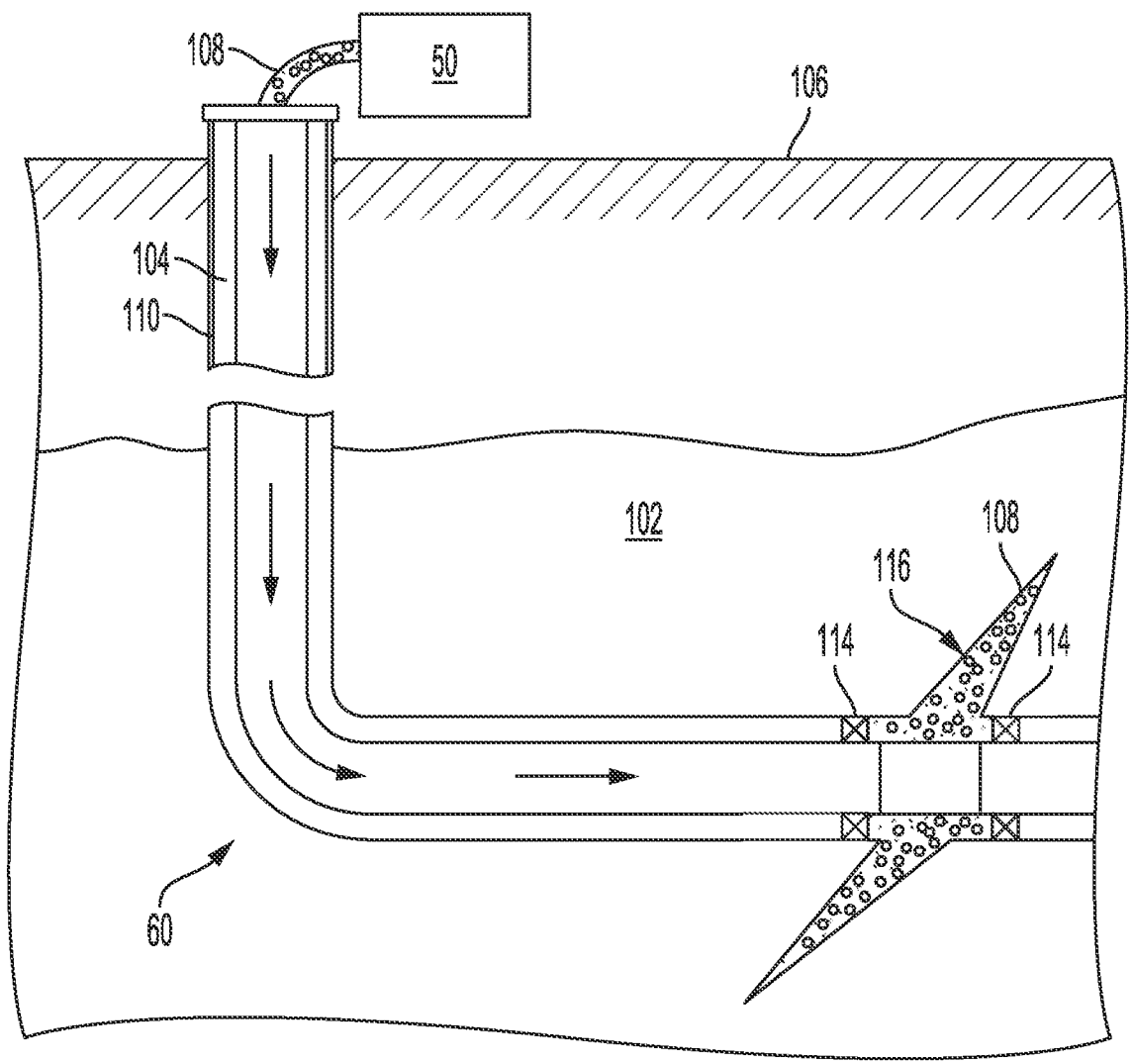
FIG. 2 shows a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
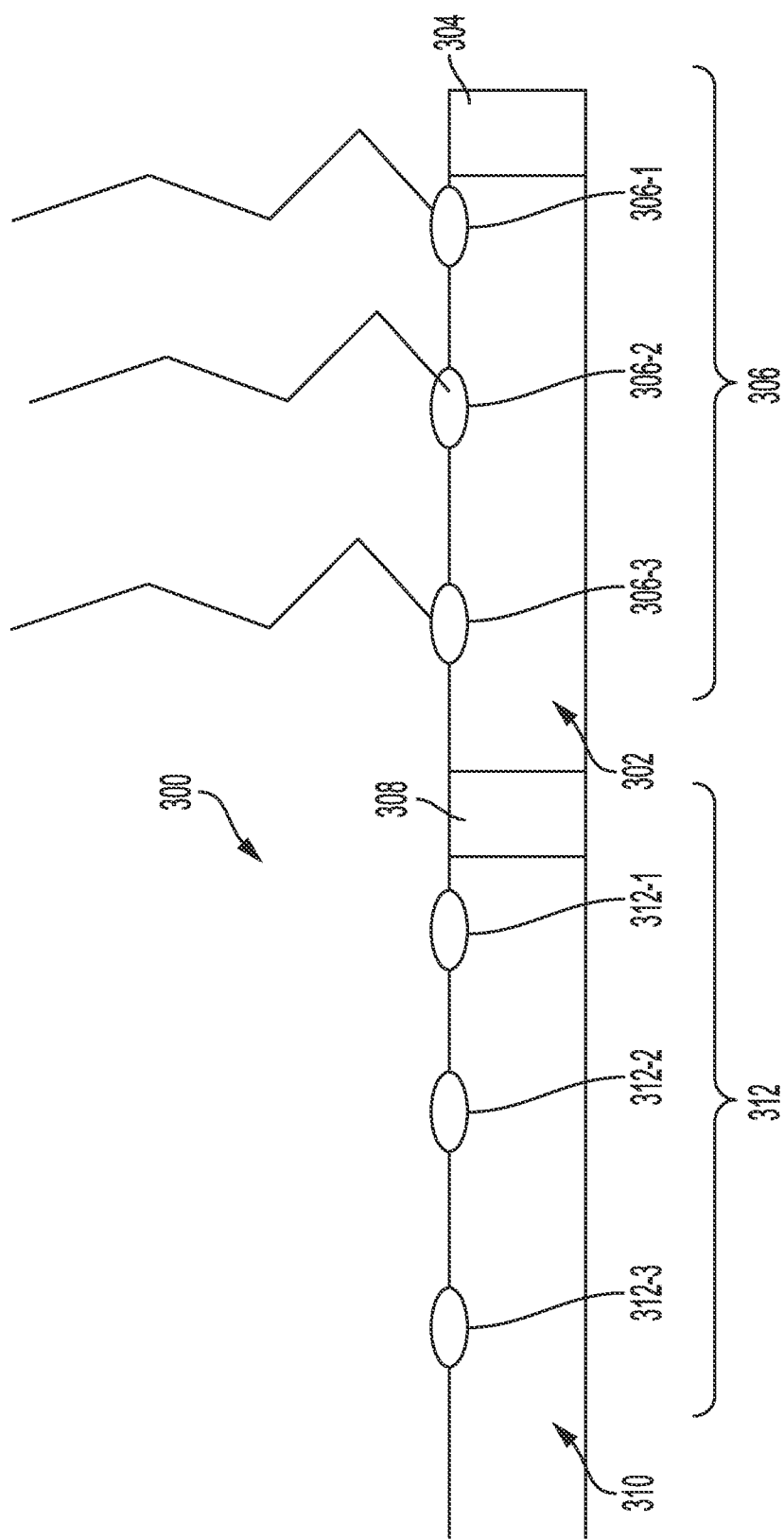
FIG. 3 shows a portion of a wellbore that is fractured using multiple fracture stages, in accordance with various aspects of the subject technology.

FIG. 3 shows a portion of a wellbore 300 that is fractured using multiple fracture stages. Specifically, the wellbore 300 is fractured in multiple fracture stages using a plug-and-perf technique.

The example wellbore 300 includes a first region 302 within a portion of the wellbore 300. The first region 302 can be positioned in proximity to a terminal end of the wellbore 300. The first region 302 is formed within the wellbore 300, at least in part, by a plug 304. Specifically, the plug 304 can function to isolate the first region 302 of the wellbore 300 from another region of the wellbore 300, e.g. by preventing the flow of fluid from the first region 302 to another region of the wellbore 300. The region isolated from the first region 302 by the plug 304 can be the terminal region of the wellbore 300. Alternatively, the region isolated from the first region 302 by the plug 304 can be a region of the wellbore 300 that is closer to the terminal end of the wellbore 300 than the first region 302. While the first region 302 is shown in FIG. 3 to be formed, at least in part, by the plug 304, in various embodiments, the first region 302 can be formed, at least in part, by a terminal end of the wellbore 300 instead of the plug 304. Specifically, the first region 302 can be a terminal region within the wellbore 300.

The first region 302 includes a first perforation 306-1, a second perforation 306-2, and a third perforation 306-3. The first perforation 306-1, the second perforation 306-2, and the third perforation 306-3 can form a perforation cluster 306 within the first region 302 of the wellbore 300. While three perforations are shown in the perforation cluster 306, in various embodiments, the perforation cluster 306 can include fewer or more perforations. As will be discussed in greater detail later, fractures can be formed and stabilized within a subterranean formation through the perforations 306-1, 306-2, and 306-3 of the perforation cluster 306 within the first region 302 of the wellbore 300. Specifically, fractures can be formed and stabilized through the perforation cluster 306 within the first region 302 by pumping fracturing fluid and solid particles into the first region 302 and through the perforations 306-1, 306-2, and 306-3 into the subterranean formation.

The example wellbore 300 also includes a second region 310 positioned closer to the wellhead than the first region 302. Conversely, the first region 302 is in closer proximity to a terminal end of the wellbore 300 than the second region 310. For example, the first region 302 can be a terminal region of the wellbore 300 and therefore be positioned closer to the terminal end of the wellbore 300 than the second region 310. The second region 310 is isolated from the first region 302 by a plug 308 that is positioned between the first region 302 and the second region 310. The plug 308 can fluidly isolate the second region 310 from the first region 302. As the plug 308 is positioned between the first and second regions 302 and 310, when fluid and solid particles are pumped into the second region 310, e.g. during a fracture stage, the plug 308 can prevent the fluid and solid particles from passing from the second region 310 into the first region 302.

The second region 310 includes a first perforation 312-1, a second perforation 312-2, and a third perforation 312-3. The first perforation 312-1, the second perforation 312-2, and the third perforation 312-3 can form a perforation cluster 312 within the second region 310 of the wellbore 300. While three perforations are shown in the perforation cluster 312, in various embodiments, the perforation cluster 312 can include fewer or more perforations. As will be discussed in greater detail later, fractures can be formed and stabilized within a subterranean formation through the perforations 312-1, 312-2, and 312-3 of the perforation cluster 312 within the second region 310 of the wellbore 300. Specifically, fractures can be formed and stabilized through the perforation cluster 312 within the second region 310 by pumping fracturing fluid and solid particles into the second region 310 and through the perforations 312-1, 312-2, and 312-3 into the subterranean formation.

In fracturing the wellbore 300 in multiple fracturing stages through a plug-and-perf technique, the perforation cluster 306 can be formed in the first region 302 before the second region 310 is formed using the plug 308. Specifically, the perforations 306-1, 306-2, and 306-3 can be formed before the perforations 312-1, 312-2, and 312-3 are formed in the second region 310. As will be discussed in greater detail later, the perforations 306-1, 306-2, and 306-3 can be formed using a wireline-free actuation. Once the perforations 306-1, 306-2, and 306-3 are formed, fracturing fluid and solid particles can be transferred through the wellbore 300 into the perforations 306-1, 306-2, and 306-3 to form and stabilize fractures in the subterranean formation as part of a first fracturing stage. The fracturing fluid and solid particles can be transferred from a wellhead of the wellbore 300 to the first region 302 through the second region 310 of the wellbore 300. Specifically, the fracturing fluid and solid particles can be transferred through the second region 310 before the second region 310 is formed, e.g. using the plug 308, and the perforation cluster 312 is formed. This can ensure, at least in part, that the fracturing fluid and solid particles flow through the second region 310 and into the subterranean formation through the perforations 306-1, 306-2, and 306-3 within the perforation cluster 306 in the first region 302.

After the fractures are formed through the perforations 306-1, 306-2, and 306-3, the wellbore 300 can be filled with the plug 308. Specifically, the wellbore 300 can be plugged with the plug 308 to form the second region 310. Then, the perforations 312-1, 312-2, and 312-3 can be formed, e.g. using a wireline or wireline-free actuation. Once the perforations 312-1, 312-2, and 312-3 are formed, fracturing fluid and solid particles can be transferred through the wellbore 300 into the perforations 312-1, 312-2, and 312-3 to form and stabilize fractures in the subterranean formation as part of a second fracturing stage. The fracturing fluid and solid particles can be transferred from the wellhead of the wellbore 300 to the second region 310 while the plug 308 prevents transfer of the fluid and solid particles to the first region 302. This can effectively isolate the first region 302 until the first region 302 is accessed for production of resources, e.g. hydrocarbons. After the fractures are formed through the perforation cluster 312 in the second region 310, a plug can be positioned between the second region 310 and the wellhead, e.g. to fluidly isolate the second region 310. This process of forming perforations, forming fractures during a fracture stage, followed by plugging on a region by region basis can be repeated. Specifically, this process can be repeated up the wellbore towards the wellhead until a completion plan for the wellbore 300 is finished.

Figure 4:
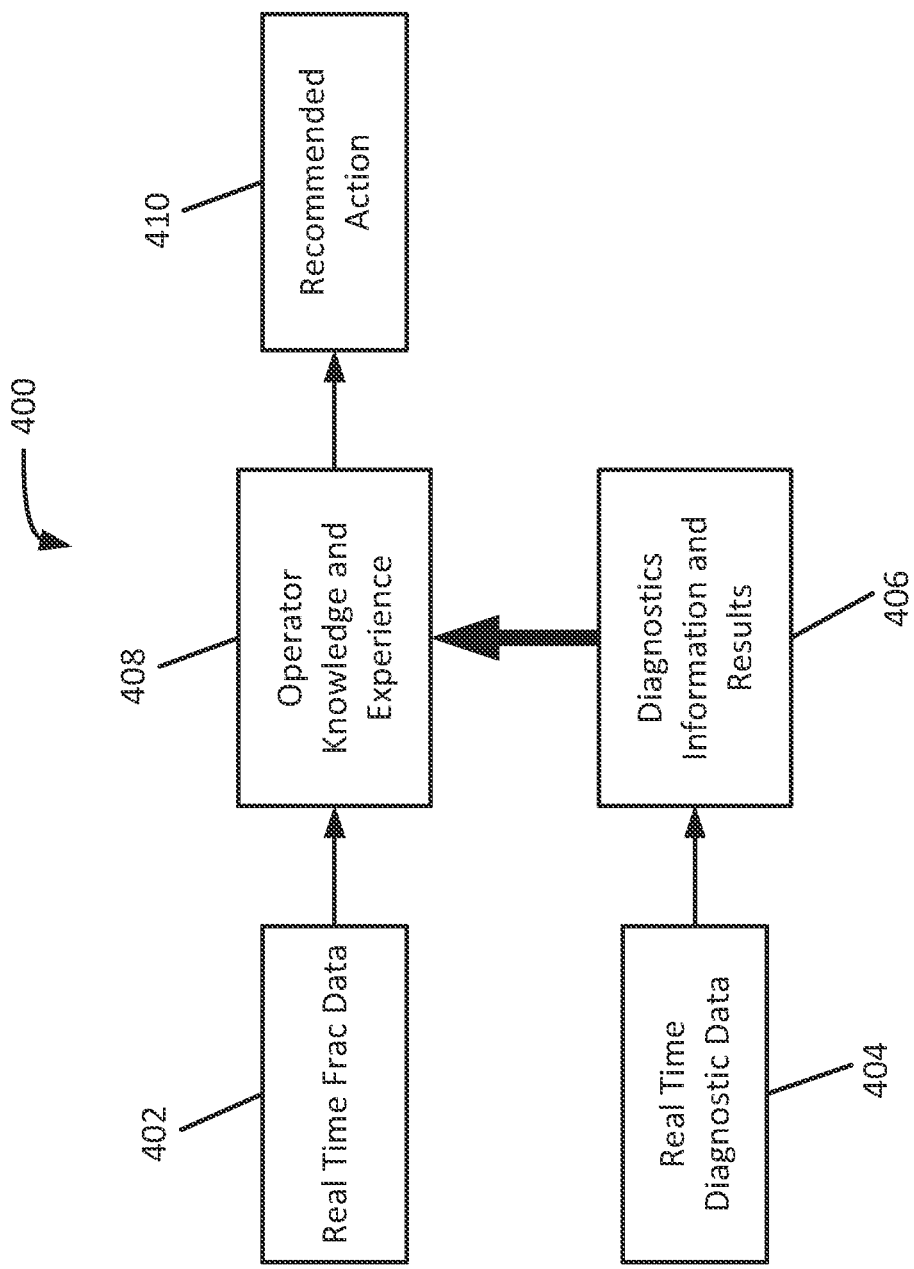
FIG. 4 shows an example flow of a method for controlling a fracturing completion job based on both surface observations and subsurface diagnostics, in accordance with various aspects of the subject technology.

FIG. 4 shows an example flow 400 of a method for controlling a fracturing completion job based on both surface observations and subsurface diagnostics. The method shown in FIG. 4 can be implemented with an applicable fracturing system for completing a wellbore. For example, the method shown in FIG. 4 can be used to control the fracturing system 10 shown in FIG. 1.

The method shown in FIG. 4 can be applied during a fracturing completion job of one or more wellbores. Specifically, and as will be discussed in greater detail later, the method can be applied to perform the fracturing completion job according to one or more fracturing completion plans. More specifically, the method can be applied to identify one or more fracturing completion plans for performing/continuing the fracturing completion job.

A fracturing completion plan, as used herein, can specify how to perform hydraulic fracturing to achieve a target completion in a wellbore. A target completion in a wellbore can specify desired characteristics of a hydraulic fracture completion in a wellbore. For example, a target completion can include fractures that extend anywhere from between 80 and 100 feet into a reservoir to several hundred feet into the reservoir. Further in the example, the target completion can include that the fractures are formed at locations through the wellbore that are spaced apart from each other by 10 feet. A target completion can be specified by a customer. As follows, the fracturing completion job can be performed to achieve, or otherwise attempt to achieve, the target completion for the customer.

In specifying how to perform hydraulic fracturing for a wellbore completion, a fracturing completion plan can include values of varying fracturing completion parameters and/or reservoir parameters. More specifically, a fracturing completion plan can include values of fracturing completion parameters and/or reservoir parameters that vary across different fracturing completion plans, thereby distinguishing the fracturing completion plans from each other. In turn, different fracturing completion plans, corresponding to different values of fracturing completion parameters and/or reservoir parameters, can be applied in performing the fracturing completion job, e.g. to achieve the target completion. For example, in performing the fracturing completion job, an operator can apply an initial fracturing completion plan and modify a fracturing completion parameter of the initial fracturing completion plan, effectively applying a new fracturing completion plan.

Fracturing completion and reservoir parameters can include applicable parameters related to performing hydraulic fracturing, e.g. as part of a well completion, in a formation. Specifically, fracturing completion parameters and reservoir parameters can include applicable parameters that are variable as part of performing hydraulic fracturing in a formation. For example, reservoir parameters can include varying characteristics of a formation, e.g. varying matrix permeability and porosity, in which hydraulic fracturing is or will be performed. Fracturing completion and reservoir parameters can include applicable parameters related to perforation/opening formation in a wellbore as part of performing hydraulic fracturing. For example, fracturing completion parameters can include parameters related to control of a wireline or a non-wireline technique for forming perforations in a wellbore as part a hydraulic fracturing process.

Further, fracturing completion and reservoir parameters can include applicable parameters related to fracture creation and stabilization into a medium through perforations/opening in a wellbore as part of performing hydraulic fracturing. Specifically, fracturing completion and reservoir parameters can include fluid control parameters related to hydraulic fracturing. For example, fracture completion parameters can include a rate at which fluid is pumped into a wellbore for forming fractures through the wellbore. Further, fracturing completion and reservoir parameters can include proppant control parameters related to hydraulic fracturing. For example, fracture completion parameters can include a type of proppant that is pumped into a wellbore, a rate at which the proppant is pumped into the wellbore, and applicable proppant concentration ramp characteristics for stabilizing fractures through the wellbore. Additionally, fracturing completion and reservoir parameters can include additive control parameters. For example, fracture completion parameters can include an amount of at least one of a viscosifier, a friction reducer, a diverter agent, a pH adjustment agent, a surfactant, a clay stabilizer, a formation stabilizer, a viscosity breaker additive, and other applicable additives to add to a proppant mixture pumped down a wellbore for stabilizing fractures through the wellbore.

In the example flow 400 shown in FIG. 4, surface diagnostics data at the fracturing completion job, otherwise referred to as real time fracturing data, is gathered at step 402. Surface diagnostics data can describe applicable surface observations at the fracturing completion job. For example, surface diagnostics data can describe surface pressures and offset or monitoring well pressures at one or more wellbores of the fracturing completion job, injection characteristics of either or both fluid and proppant into the one or more wellbores, and injection characteristics of one or more additives into the one or more wellbores. For example, surface diagnostics data can describe rates at which a diverter is introduced into a wellbore as part of a diverter stage of the fracturing completion job. Surface diagnostics data can be gathered by applicable sensors, equipment, and surface monitoring technique, associated with hydraulic fracturing. For example, surface diagnostics data can be gathered by flow sensors integrated at wellheads of a pad.

Additionally, in the example flow 400 shown in FIG. 4, subsurface diagnostics data at the fracturing completion job, otherwise referred to as real time diagnostics data, is gathered at step 404. Subsurface diagnostics data can describe applicable subsurface diagnostics occurring at the fracture completion job. Specifically, subsurface diagnostics data can describe flowrates per perforation cluster in a wellbore of the fracturing completion job, flowrates per perforation in the wellbore, temperature on stages in the wellbore, microseismic activity in the wellbore, acoustic measurements in the wellbore, strain measurements in the wellbore, bottom hole pressure in the wellbore, and instantaneous shut in pressures in the wellbore. Shut in pressure, as used herein, includes a pressure in a wellbore once fluid, proppant, and additives are no longer pumped into the wellbore at a completion of a fracture creation and stabilization stage. Subsurface diagnostics data can be gathered through applicable sensors, equipment, and subsurface monitoring techniques associated with hydraulic fracturing. For example, subsurface diagnostics data at the fracturing completion job can be gathered using one or more fiber optic cables, e.g. fiber optic cables integrated with one or more wellbores of the fracturing completion job. In another example, subsurface diagnostics data at the fracturing completion job can be gathered by one or more acoustic sensors, e.g. acoustic sensors integrated with one or more wellbores of the fracturing completion job. In yet another example, subsurface diagnostics data at the fracturing completion job can be gathered by one or more strain sensors, e.g. strain sensors integrated with one or more wellbores of the fracturing completion job. In another example, subsurface diagnostics data can be gathered by systems and equipment that measure casing strain and/or well deformation in a wellbore.

Both the surface diagnostics data and the subsurface diagnostics data can be gathered by monitoring off-set wells. Specifically, surface diagnostics data and subsurface diagnostics data for a well can be gathered by monitoring an adjacent well, similar to as is previously discussed with respect to off-set well monitoring. For example, microseismic activity in a well can be monitored through a fiber optic cable implemented in an adjacent well. Further in the example, the monitored well can function only as a monitoring well in which fracturing operations are not actually performed.

Both the surface diagnostics data and the subsurface diagnostics data gathered at steps 402 and 404 can be included as part of completion characteristics data for the fracturing completion job. Completion characteristics data, as used herein, includes data describing applicable characteristics of a well completion job. For example, completion characteristics data can include estimated characteristics of fractures formed and stabilized during the fracturing completion job. Completion characteristics data can be gathered before the fracturing completion job is performed as part of the well completion, while the fracturing completion job is performed as part of the well completion, and after the fracturing completion job is performed as part of the well completion. Specifically, completion characteristics data for the fracturing completion job can be gathered as one or more fracturing completion plans are applied to perform the fracturing completion job. More specifically, the completion characteristics data for the fracturing completion job can be gathered as the fracturing completion job is performed according to changing fracturing completion plans, e.g. as an operator modifies a fracture completion parameters for the fracturing completion job. For example, the completion characteristics data for the fracturing completion job can be gathered as an operator changes a completion plan by introducing a diverter material during a fracturing stage.

At step 406 in the example flow 400 shown in FIG. 4, all or portions of the subsurface diagnostics data for the fracturing completion job are presented to one or more operators associated with the fracturing completion job. An operator associated with the fracturing completion job can include an applicable operator tasked with controlling the fracture completion job. An operator can either be present on-site at the fracture completion job or remote from the site of the fracture completion job. For example, an operator associated with the fracture completion job can be part of a pumping team at a pad of the fracture completion job.

Subsurface diagnostics data can be presented to the operator in an applicable format, e.g. through an applicable graphical user interface. In particular, subsurface diagnostics data can be presented to the operator in a format that allows the operator to quickly perceive the subsurface diagnostics data and react appropriately. This is important, as subsurface diagnostics data can include a large amount of complicated information that is not easily perceivable by a human. By presenting the subsurface diagnostics data in a format that is easily perceivable, the operator can quickly adjust the fracture completion job in response to the subsurface diagnostics data.

In various embodiments, including the method shown in FIG. 4, when the subsurface diagnostics are for multiple wellbores on a fracturing site, e.g. multiple wellbores pumped simultaneously, then the subsurface diagnostics data can be presented in a format that allows an operator to perceive the data for each individual wellbore.

At step 410, the operator can make a recommended action for controlling the fracture completion job. A recommended action can include not changing a current fracturing completion plan used in performing the fracture completion job. A recommended action can also include changing a current fracturing completion plan used in performing the fracture completion job. Specifically, a recommended action can include modifying one or more fracturing completion and reservoir parameters of a fracturing completion plan used in performing the fracture completion job, effectively performing the fracture completion job using a new fracturing completion plan. For example, a recommended action can include adding a diverter or diverting material during a fracture stage. In another example, a recommended action can include increasing a proppant concentration and/or flow rate in a wellbore. The fracture completion job can subsequently be performed according to the recommended action of the operator, as determined at step 410. Specifically, the operator can implement the recommended action in order to complete the one or more wellbores as part of the fracture completion job.

The operator can identify the recommended action at step 410, based on either or both the surface diagnostics data and the subsurface diagnostics data gathered at steps 402 and 404. Specifically, the operator can identify the recommended action based on the surface diagnostics data and the subsurface diagnostics data and the knowledge and experience 408 of the operator. For example, the operator can adjust a flow pressure at which fluid is pumped into a wellbore based on an observed flow rate at a perforation cluster, as indicated by the subsurface diagnostics data, and the operator's own knowledge of an ideal flow rate for the type of formation being fractured.

Figure 5:
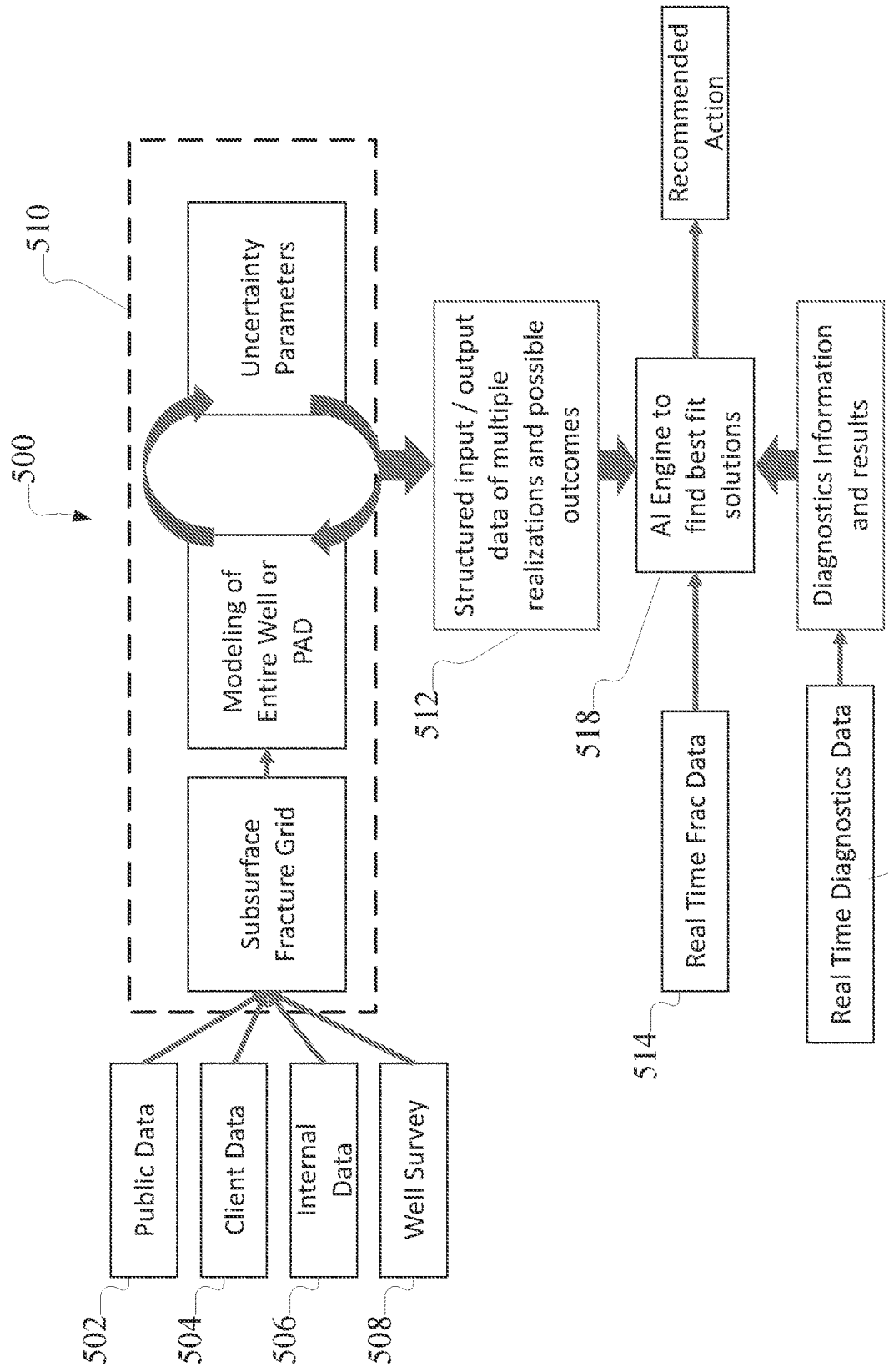
FIG. 5 shows an example flow of a method for performing a fracturing completion job with a fracture completion model, in accordance with various aspects of the subject technology.

FIG. 5 shows an example flow 500 of a method for performing a fracturing completion job with a fracture completion model. In particular, the method shown in FIG. 5 can be utilized to perform a fracture completion job in real time by facilitating control of hydraulic fracturing with a fracture completion model. Further and as will be discussed in greater detail later, the method shown in FIG. 5 can account for a large number of fracturing completion and reservoir parameters that a human would otherwise be incapable of accounting for in performing a fracture completion job. In turn, this can lead to a more accurate and efficient completion of one or more wellbores as part of a fracture completion job.

The method shown in FIG. 5 can be implemented with an applicable fracturing system for completing a wellbore. For example, the method shown in FIG. 5 can be used to control the fracturing system 10 shown in FIG. 1. Specifically, the method shown in FIG. 5 can account for a large number of fracturing completion and reservoir parameters that are controlled in completing multiple wellbores simultaneously. This is advantageous as a human would otherwise be incapable of accounting for such a large number of fracturing parameters to control a multi wellbore completion, thereby potentially leading to problems during the completion, e.g. screen outs.

In the method shown in FIG. 5, public data, client data, internal data, and well survey data can be gathered at corresponding steps 502, 504, 505, and 508. Public data can include applicable public data related to subterranean formations and/or hydrocarbon extractions. For example, public data can include wellbore scenario information that operators provide to the public, e.g. have to file with government agencies and public interest groups. Public data can be retrieved from an applicable public wellbore data storage system, such as RS Energy Group®.

Client data can include applicable client data related to subterranean formations, fracture completions, and/or hydrocarbon extractions. For example, client data can include geologic data of a fracture job site of an oil and gas production company. In another example, client data can include all or a portion of a target completion of the fracture completion job. For example, client data can specify that an oil and gas production company wants fractures that extend into a specific hydrocarbon reservoir at horizontal intervals of every 20 feet.

Internal data can include applicable data related to subterranean formations, fracture completions, and/or hydrocarbon extractions that is maintained by an entity responsible for performing the fracture completion job. For example, internal data can include geological data at well sites of past fracture completion jobs. Internal data can be specific to a client of an entity responsible for performing the fracture completion job. Further, internal data can be maintained across a plurality of different clients by an entity responsible for performing the fracture completion job.

Well survey data can include applicable data, e.g. geographical data, related to wells at a site of the current fracture completion jobs. For example, well survey data can include a physical profile of a wellbore at the current fracture completion job. Well survey data can be maintained by a customer, e.g. an oil and gas production company, or an entity responsible for performing the fracture completion job.

At step 510 in the flow 500 shown in FIG. 5, a fracturing completion model is applied to identify a plurality of possible fracturing completion plans for performing the fracture completion job. Specifically, the fracturing completion model can be applied to identify a plurality of possible fracturing completion plans for performing the fracture completion job at a target completion, e.g. a target completion of a client/customer. The possible fracturing completion plans identified through the fracturing completion model can have varying values of fracturing completion and reservoir parameters, e.g. uncertainty parameters for the fracturing completion model. Specifically, the fracturing completion model can vary different fracturing completion and reservoir parameters in order to identify a plurality of possible fracturing completion plans for achieving the target completion. For example, the possible fracturing completion plans can have varying proppant ramp characteristics to achieve the target completion. In another example, the possible fracturing completion plans can have varying fluid pumping times during fracturing stages to achieve the target completion.

Further, in identifying the plurality of possible fracturing completion plans, the fracturing completion model can also identify subsurface fracture simulations corresponding to each of the plurality of possible fracturing completion plans. A subsurface fracture simulation can include a simulated representation of fracture creation and stabilization/possible outcomes in one or more wellbores when a specific fracturing completion plan is performed. Specifically, the fracturing completion model can use a possible fracturing completion plan, as structured input, to generate a corresponding subsurface fracture simulation, as structured output. The fracturing completion model can generate subsurface fracture simulations for each of the identified possible fracturing completion and reservoir parameters. Subsequently and as will be discussed in greater detail later, the subsurface fracture simulations can be used to select a fracturing completion plan from the plurality of possible fracturing completion plans.

The fracturing completion model can be an applicable geomechanical fracture simulator for identifying possible fracturing completion plans by varying values of fracturing completion and reservoir parameters. More specifically, the fracture completion model can be an applicable geomechanical fracture simulator for identifying subsurface fracture simulations for a possible fracturing completion plans. For example, GOHFER® can be used to identify a plurality of possible fracturing completion plans and generate corresponding subsurface fracture simulations for the different possible fracturing completion plans. Further, the fracturing completion model can identify possible fracturing completion plans and corresponding subsurface fracture simulations using one or a combination of the public data, the client data, the internal data, and the well survey data gathered for the fracture completion job at corresponding steps 502, 504, 505, and 508.

The fracturing completion model can simulate fracturing completion plans to identify subsurface fracture simulations using a subsurface fracture grid. Specifically, a subsurface fracture grid can be a simulated physical grid within a subterranean formation of the fracturing completion job. More specifically, a subsurface fracture grid can be a simulated physical grid of the subterranean formation that physically quantifies fractures that are formed according to different fracturing completion plans. In turn, the fracturing completion model can use the subsurface fracture grid to simulate the possible fracturing completion plans and generate subsurface fracture simulations.

At step 512 in the flow 500 of the example method shown in FIG. 5, the possible fracturing completion plans and the corresponding subsurface fracture simulations are provided to a fracturing decision engine 617. The fracturing decision engine 617 can use the possible fracturing completion plans and the corresponding subsurface fracture simulations to identify a fracturing completion plan to apply in performing the fracture completion job. More specifically, the fracturing decision engine 617 can select a fracturing completion plan to apply in achieving the target completion based on the possible fracturing completion plans and the corresponding subsurface fracture simulations.

The fracturing decision engine 617 can select the fracturing completion plan from the plurality of possible fracturing completion plans through machine learning and/or artificial intelligence. The fracturing decision engine 617 can use an applicable machine learning and/or artificial intelligence technique, e.g. one or more completion plan selection model (s), to select the fracturing completion plan from the plurality of possible fracturing completion plans. Specifically, the fracturing decision engine 617 can use machine learning and/or artificial intelligence, e.g. a completion plan selection model, to select the fracturing completion plan for achieving the target completion in the one or more wellbores during the fracture completion job. For example, the fracturing decision engine 617 can use machine learning and/or artificial intelligence to select the fracturing completion plan from the possible fracturing completion plans based on a predicted accuracy of the fracturing completion plan in achieving the target completion. Further in the example, the fracturing decision engine 617 can use artificial intelligence and machine learning to predict accuracies of each of the possible fracturing completion plans in achieving the target completion, e.g. based on similarities between the target completion and subsurface fracture simulations of the fracturing completion plans. As follows, the fracturing decision engine 617 can select a possible fracturing completion plan that is predicted to most accurately achieve the target completion.

The selected fracturing completion plan can be an initial fracturing completion plan. Specifically, the selected fracturing completion plan can be the first fracturing completion plan that is implemented to start the fracture completion job. The initial fracturing completion plan can be selected based on a predicted accuracy of the fracturing completion plan in achieving the target completion, e.g. based on similarities between the subsurface fracture simulation of the fracturing completion plan and the target completion. The initial fracturing completion plan can be selected without completion characteristic data of the fracture completion job, e.g. before fracture completion operations are actually carried out to generate the completion characteristic data.

Further, the fracturing completion plan can be a new/replacement fracturing completion plan that can be implemented to replace a current fracturing completion plan in performing the fracture completion job. Specifically, at step 518, the fracturing decision engine 617 can select the new fracturing completion plan while the current fracturing completion plan is performed. As follows, the fracturing completion job can be performed according to the new fracturing completion plan, effectively switching fracturing completion plans. The new fracturing completion plan can be selected and implemented in an attempt to more accurately achieve the target completion. For example, the current fracturing completion plan can be causing screen outs during the fracture completion job leading to failed realization of the target completion. As follows, the new fracturing completion plan can be selected and implemented to reduce screen out occurrences and more closely realize the target completion.

The fracturing decision engine 617 can determine whether to select the new fracturing completion plan from the plurality of possible fracturing completion plans through application of machine learning and/or artificial intelligence, e.g. through application of a completion plan selection model. The fracturing decision engine 617 can determine whether to select a new completion plan and subsequently select the new fracturing completion plan based on performance characteristics of the currently implemented fracturing completion plan. Specifically, the fracturing decision engine 617 can determine deficiencies of the current fracturing completion plan from completion characteristics data, including surface diagnostics data gathered at step 514 and subsurface diagnostics data gathered at step 516, for the current fracturing completion plan. As follows, the fracturing decision engine 617 can determine to switch to a new fracturing completion plan and subsequently select the new fracturing completion plan based on the completion characteristics data for the current fracturing completion plan. For example, if subsurface diagnostics data indicates that a screen out is occurring, then the fracturing decision engine 617 can select a new fracturing completion plan, e.g. a plan that adds a viscosifier, to reduce the chances of screen out occurrence.

The fracturing decision engine 617 can apply machine learning and/or artificial intelligence to the completion characteristics data to select a fracturing completion plan, e.g. an initial fracturing completion plan or a replacement fracturing completion plan, from the plurality of possible fracturing completion plans. Specifically, the fracturing decision engine 617 can apply a completion plan selection model that is trained through artificial intelligence and machine learning to the surface diagnostics data and the subsurface diagnostics data to select a fracturing completion plan from the plurality of possible fracturing completion plans. For example, the fracturing decision engine 617 can apply a completion plan selection model to the completion characteristics data to recognize deficiencies in the current fracturing completion plan. As follows, the fracturing decision engine 617 can use the completion plan selection model to select the new fracturing completion plan while accounting for the large number of fracturing completion and reservoir parameters that form the possible fracturing completion plans.

A completion plan selection model can map events, both unfavorable events and favorable events, occurring in a fracture completion to values of fracturing completion and reservoir parameters, e.g. values of parameters that form a fracture completion plan. Further, a completion plan selection model can map events, both unfavorable events and favorable events, occurring in a fracture completion to completion characteristics data, e.g. either or both subsurface and surface diagnostics data. For example, the fracturing decision engine 617 can recognize an occurrence of a runaway fracture by applying machine learning and/or artificial intelligence to subsurface pressures included in subsurface diagnostics data. Further in the example, the fracturing decision engine 617 can apply the completion plan selection model to diagnose that a diverter material should to be added during a fracturing stage to account for runaway fractures. As follows, the fracturing decision engine 617 can select a new fracturing completion plan that adds the diverter material during the fracturing stage based on application of the completion plan selection model.

Using machine learning and/or artificial intelligence to select a fracturing completion plane, e.g. a new fracturing completion plan, is advantageous as a human is typically unable to timely analyze the wealth of completion characteristic data. Specifically, a human is typically unable to timely analyze the wealth of completion characteristics data to determine whether to apply a new fracturing completion plan. Further, using machine learning and/or artificial intelligence to select a new fracturing completion plan is advantageous as a human is typically unable to analyze the large number of fracturing completion parameters and/or reservoir parameters for selecting the new fracturing completion plan. These advantages are further realized when fracturing is performed on multiple wellbores and potentially simultaneously on the multiple wellbores. Specifically, fracturing on multiple wellbores simultaneously can increase the number of fracturing completion parameters and/or reservoir parameters that need to be accounted for and the complexity of the fracturing completion parameters and the reservoir parameters that should be accounted for in selecting a fracturing completion plan, e.g. a new fracturing completion plan. Applying machine learning and/or artificial intelligence can insure that the numerous and complex fracturing completion and reservoir parameters present in a multi-wellbore fracturing job are properly accounted for in selecting a new fracturing completion plan.

Once a fracturing completion plan is selected from the plurality of possible fracturing completion plans, then the method can include facilitating performance of the fracture completion job according to the selected fracturing completion plan. In facilitating implementation of the selected fracturing completion plan, one or more alerts, actionable alerts, can be presented to an operator for implementing the fracture completion job. For example, an alert can be presented that instructs an operator to increase a concentration of proppant. Further, in facilitating implementation of the selected fracturing completion plan, a fracturing system used in performing the fracturing job can be controlled to implement the fracturing completion plan. Specifically, instructions for implementing the selected fracturing completion plan to the fracturing system and the fracturing system can autonomously control itself according to the instructions to implement the selected fracturing completion plan.

In facilitating performance of the fracture completion job according to the selected fracturing completion plan, the method can include facilitating switching to the new fracturing completion plan for completing the one or more wellbores. Specifically, alerts for implementing, or otherwise switching to the new fracturing completion plan, can be presented to an operator. Subsequently, the operator can use the alerts to control a fracturing system according to the new fracturing completion plan. Further, instructions for implementing the new fracturing completion plan can be provided to the fracturing system. The fracturing system can then autonomously control itself to operate according to the instructions and implement the new fracturing completion plan.

Either or both surface diagnostics data and subsurface diagnostics data, e.g. gathered at steps 514 and 516 can be used to train/retrain the fracturing completion model applied at step 510. In turn, the trained/retrained fracturing completion model can be used to generate a plurality of possible fracturing completion plans. Specifically, the trained/retrained fracturing completion model can be used to generate corresponding subsurface fracturing simulations for each of the possible fracturing completion plans. As follows, the plurality of possible fracturing completion plans and corresponding subsurface fracturing simulations can be analyzed, e.g. based on machine learning, to select a fracture completion plan, e.g. an initial fracturing completion plan or a changed fracturing completion plan, to implement in performing a fracture completion job. The trained/retrained fracturing completion model can be applied to one or a plurality of different fracturing completion jobs from the fracturing completion job that is the subject of the flow 500 shown in FIG. 5.

Further, either or both surface diagnostics data and subsurface diagnostics data, e.g. gathered at steps 514 and 516 can be used to train/retrain the completion plan selection model applied at step 518. In turn, the trained/retrained completion plan selection model can be used to select a new fracture completion plan from the plurality of fracture completion plans for the fracturing completion job. The trained/retrained completion plan selection model can be applied to one or a plurality of different fracturing completion jobs from the fracturing completion job that is the subject of the flow 500 shown in FIG. 5.

The fracturing completion model and/or the completion plan selection model can be trained/retrained using parameters of the fracturing completion plans, e.g. values of varying fracturing completion parameters and/or reservoir parameters, which are applied to formulate the different fracturing completion plans. Specifically, values of parameters of the applied fracturing completion plans can be correlated with the completion characteristics data based on times that the applied fracturing completion plans are implemented and times that the completion characteristics data is generated. This can ensure that the completion characteristics data is accurately associated with values of fracturing completion and reservoir parameters of completion plans that were used to generate the completion characteristics data. As follows, the fracturing completion model and/or the completion plan selection model can be trained/retrained with the completion characteristics data and corresponding values of the fracturing completion and reservoir parameters used in generating the completion characteristics data.

Further, the fracturing completion model and/or the completion plan selection model can be trained/retrained based on specific events occurring during the fracturing completion job. Specifically, an occurrence of an event can be correlated with values of fracturing completion and reservoir parameters at the time the event occurred. Subsequently, the fracturing completion model and/or the completion plan selection model can be trained/retrained based on the values of the fracturing completion and reservoir parameters correlated with the specific event. For example, a runaway fracture can be detected during the fracturing completion job. Further in the example, the values of fracturing completion and reservoir parameters that caused the runway fracture can be correlated with the runaway fracture. Specifically, a flow rate of proppant slurry and fluid that led to the runaway fracture can be correlated with an occurrence of the runaway fracture. In turn, the fracturing completion model and/or the completion plan selection model can be trained/retrained based on the values of the fracturing completion and reservoir parameters that led to the runaway fracture.

Figure 6A:
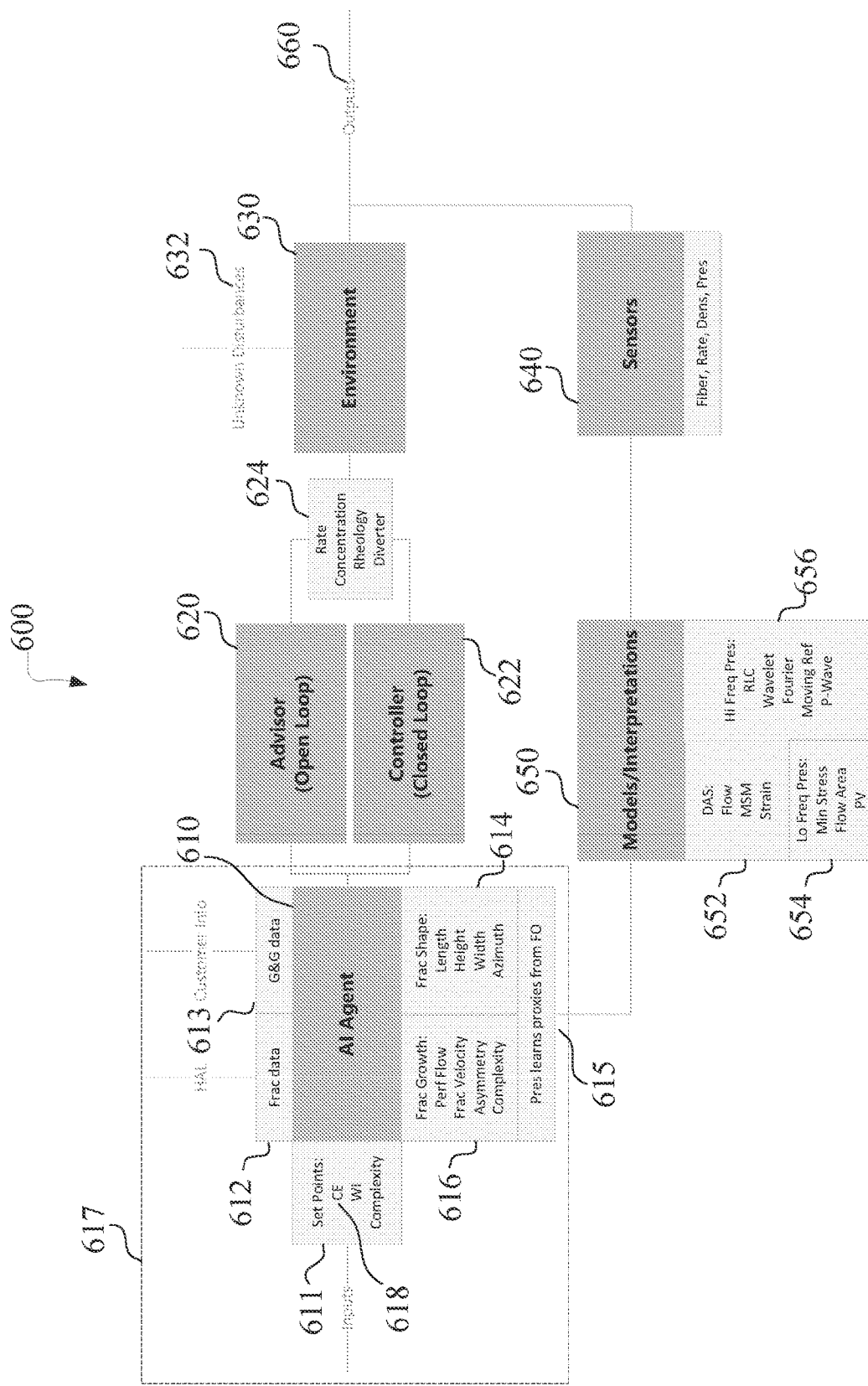
FIGS. 6A-6C show example diagrams of a fracturing system for controlling a fracturing completion job based on cluster efficiency, in accordance with various aspects of the subject technology.
Figure 6B:
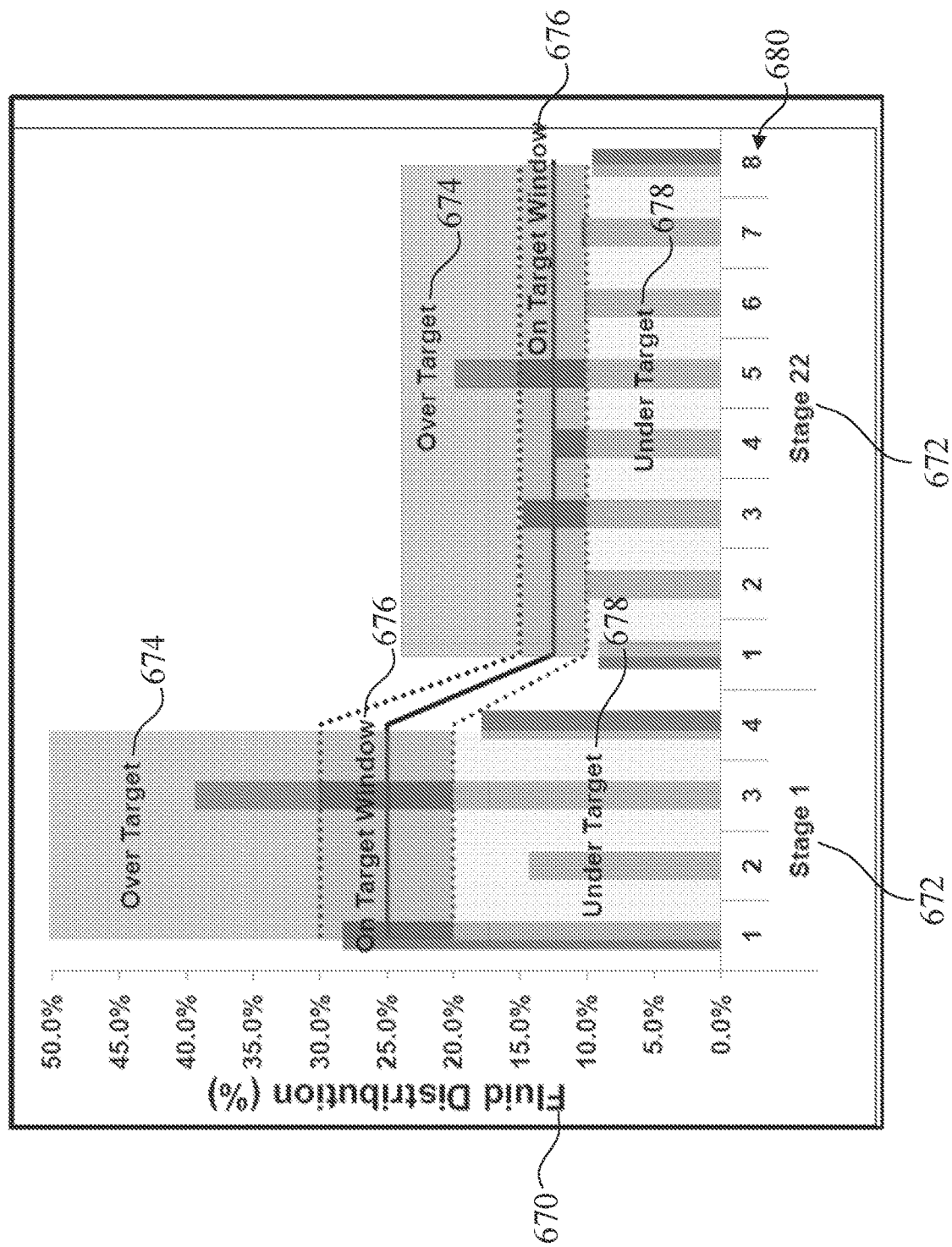
Figure 6C:
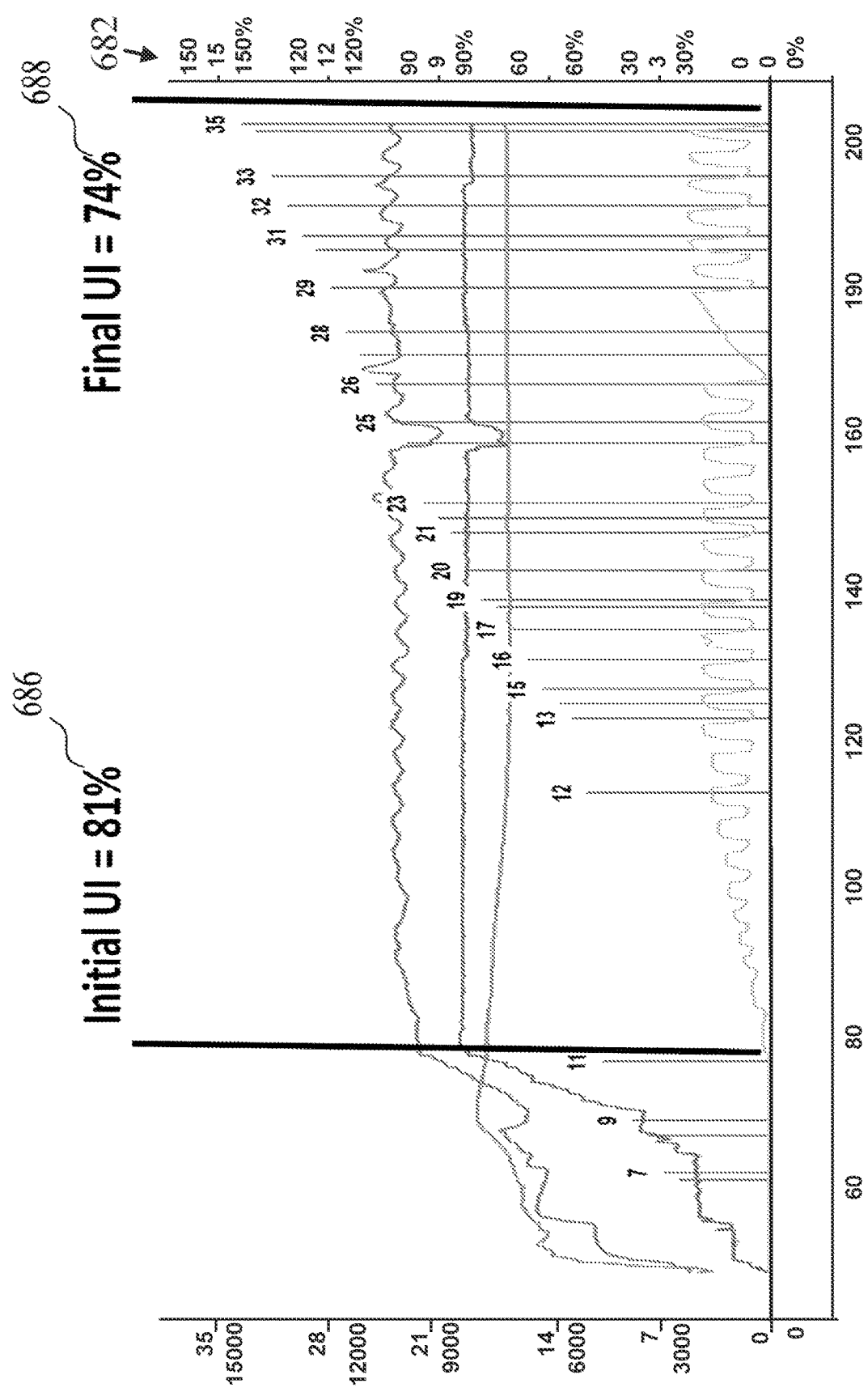

FIGS. 6A-6C show example diagrams of a fracturing system 600 for controlling a fracturing completion job based on cluster efficiency. Fracturing system 600 as shown in FIG. 6A can be implemented using the systems, methods, and techniques described herein. In particular, the disclosed system, methods, and techniques may directly or indirectly affect one or more components or pieces of equipment associated with the example fracturing system 600, according to one or more embodiments. In some implementations, fracturing system 600 can include an artificial intelligence agent 610, an advisor 620/controller 622, environment parameters 630, sensors 640, and models 650. All or an applicable combination of these components of the fracturing system 600 can reside at the surface at a well site/ fracturing pad where a well 60 is located.

During a fracturing job, fracturing system 600 can include performing a fracture completion job in real time by facilitating control of hydraulic fracturing based on set point data 611 as described herein along with a fracture completion model 650. As further described herein, fracturing system 600 can utilize fracture completion model 650 to facilitate control of hydraulic fracturing as described herein and interpret data received from public data, set point inputs 611, internal fracturing data 612, customer fracturing data 613, fracturing shape 614, pressure data 615, fracturing growth 616, and sensors 640. Furthermore, as will be discussed in greater detail below, fracturing system 600 can account for a large number of fracturing completion and reservoir parameters, which a human would otherwise be incapable of accounting for, in performing a fracture completion job. In turn, this can lead to a more accurate and efficient completion of one or more wellbores as part of a fracture completion job.

In some implementations, fracturing system 600 as shown in FIG. 6A can account for a large number of fracturing completion, set point data 611, and reservoir parameters (e.g., fracturing shape 614, fracturing growth 616, and data from sensors 640) that can be controlled in completing multiple wellbores simultaneously or individually. This is advantageous as a human would otherwise be incapable of accounting for such a large number of fracturing parameters (e.g., fracturing shape 614, fracturing growth 616, and data from sensors 640) to control a multi-wellbore completion, thereby potentially leading to problems during the completion (e.g., screen outs).

In some instances, public data, internal data 612, customer fracturing data 613, and well survey data (e.g., set point data 611, fracturing shape 614, pressure data 615, and fracturing growth 616) can be gathered and received by artificial intelligence agent 610 to implement fracturing operations. Public data can include applicable public data related to subterranean formations and/or hydrocarbon extractions. For example, public data can include wellbore scenario information that operators provide to the public (e.g., having to file with government agencies and public interest groups). Public data can be retrieved from an applicable public wellbore data storage system, such as RS Energy Group®. In some instances, public data can be received via communication interfaces (e.g., wired and/or wireless) for communicating public data to other devices such as artificial intelligence agent 610, advisor 620, controller 622, and/or any other device.

Set point data 611 can include applicable data related to cluster efficiency 618, wellbore interference, and complexity of the overall distribution of fracturing activity. For example, cluster efficiency 618 can include data related to individual perforations, clusters of perforations, overall performance of wellbores, and any other data related to cluster efficiency 618 that is suitable for the intended purpose and understood by a person of ordinary skill in the art.

In some implementations, data related to cluster efficiency 618 can further include flow distribution data of fluids throughout the wellbore. The wellbore can include perforations distributed throughout the wellbore in clusters. Perforations can be formed in the casing to allow fracturing fluids and/or other materials to flow into the subterranean formation. As discussed herein, perforations can be formed in the casing using an applicable wireline-free actuation. When the fracturing fluid is introduced into the wellbore, it can flow through at least a portion of the wellbore to the perforations. The fracturing fluid can be pumped at a sufficient pumping rate through at least a portion of the wellbore to generate fractures through the perforations and into the subterranean formation. For example, the fracturing fluid can be pumped at a sufficient pumping rate to generate a sufficient hydraulic pressure at the perforation to form fractures. Furthermore, solid particles (e.g., proppant from the solid source) can be pumped into the wellbore, e.g., within the fracturing fluid towards the perforations. In turn, the solid particles can enter the fractures where they can remain after the fracturing fluid flows out of the wellbore.

Multiple perforations can form a perforation cluster within the wellbore. In various embodiments, the perforation cluster can include fewer or more perforations. As discussed herein, fractures can be formed and stabilized within a subterranean formation through the perforations of the perforation cluster within the wellbore. For example, fractures can be formed and stabilized through the perforation cluster within the wellbore by pumping fracturing fluid and solid particles into the wellbore and through the perforation clusters into the subterranean formation.

After the fractures are formed through the perforation clusters, the wellbore can be filled with the plug. For example, the wellbore can be plugged with the plug to form additional regions. Then, the perforation clusters can be formed, e.g. using a wireline or wireline-free actuation. Once the perforation clusters are formed, fracturing fluid and solid particles can be transferred through the wellbore into the perforation clusters to form and stabilize fractures in the subterranean formation. The fracturing fluid and solid particles can be transferred from the wellhead of the wellbore while the plug prevents transfer of the fluid and solid particles to a prior region. This can effectively isolate the prior region until the prior region is accessed for production of resources, e.g. hydrocarbons. After the fractures are formed through the perforation cluster in the subsequent region, a plug can be positioned between the subsequent region and the wellhead, e.g., to fluidly isolate the subsequent region. This process of forming perforations, forming fractures during a fracture stage, followed by plugging on a region by region basis can be repeated. Specifically, this process can be repeated up the wellbore towards the wellhead until a completion plan for the wellbore is finished.

Additionally, subsurface diagnostics data relating to cluster efficiency 618 can be gathered at the fracturing completion job. Subsurface diagnostics data can describe applicable subsurface diagnostics occurring at the fracture completion job. For example, subsurface diagnostics data including data relating to cluster efficiency 618 can describe flow rates per perforation cluster in a wellbore of the fracturing completion job, flow rates per perforation in the wellbore, temperature on stages in the wellbore, microseismic activity in the wellbore, acoustic measurements in the wellbore, strain measurements in the wellbore, bottom hole pressure in the wellbore, and instantaneous shut in pressures in the wellbore.

Subsurface diagnostics data relating to cluster efficiency 618 can further be gathered through applicable sensors, equipment, and subsurface monitoring techniques associated with hydraulic fracturing. For example, subsurface diagnostics data relating to cluster efficiency 618 at the fracturing completion job can be gathered using one or more fiber optic cables, e.g. fiber optic cables integrated with one or more wellbores of the fracturing completion job. In another example, subsurface diagnostics data relating to cluster efficiency 618 at the fracturing completion job can be gathered by one or more acoustic sensors, e.g. acoustic sensors integrated with one or more wellbores of the fracturing completion job. In yet another example, subsurface diagnostics data relating to cluster efficiency 618 at the fracturing completion job can be gathered by one or more strain sensors, e.g. strain sensors integrated with one or more wellbores of the fracturing completion job. In another example, subsurface diagnostics data relating to cluster efficiency 618 can be gathered by systems and equipment that measure casing strain and/or well deformation in a wellbore.

The fracturing system 600 or an operator can identify an action based on either or both the surface diagnostics data and the subsurface diagnostics data relating to cluster efficiency 618. For example, the fracturing system 600 or the operator can identify the action based on the surface diagnostics data and the subsurface diagnostics data relating to cluster efficiency 618 and the knowledge and experience of the operator. For example, the operator can adjust a flow pressure at which fluid is pumped into a wellbore based on an observed flow rate at a perforation cluster, as indicated by the subsurface diagnostics data relating to cluster efficiency 618, and the operator's own knowledge of an ideal flow rate for the type of formation being fractured.

In some implementations, fracturing system 600 can include the ability to weight across different surface variables. For example, the surface variables can control various parameters such as rate, proppant concentration, rheology, and diverters. In other instances, fracturing system 600 can include the ability to weight against various objective functions. For example, the objective functions can include cluster efficiency 618, wellbore interference, complexity, and fiscals.

In other implementations, clusters of perforations can include one or more clusters within a range between three and a dozen clusters in one fracture. As fluid is pumped down the case, it will essentially choose its own path out of any of the individual clusters of perforations based on formation stresses and the pressures in the fractures, as with pumping. These formation stresses and pressure changes can affect cluster efficiency 618 and be measured with a distributed fiber optic sensing line along the wellbore. As described herein, acoustic measurements can be determined by utilizing the fiber optic line. Thereafter, the acoustic measurement can be converted to provide a flow estimation at each individual cluster and cluster efficiency 618. The flow estimation can be utilized as a metric that provides insight as to how well distributed the fluid and sand are between the different clusters of perforations.

In some instances, once flow estimation and distribution is determined for each of the clusters of perforations (e.g., determining an objective function such as cluster efficiency 618), increasing and/or breaking down the perforations can be utilized to control the fracturing job. For example, fluid can be pumped through the casing to begin breaking up or start to open up the fractures from each of the clusters of perforations. The objective function can be related to flow distribution across and through the clusters of perforations when viewed on a per cluster basis and across different clusters. By converging to a uniform flow distribution, the objective function can be maximized. The action of pumping fluid into the casing can directly impact overall cluster efficiency 618. In some instances, a first surface variable can be utilized to pump fluid throughout the treatment that impacts the distribution of fluid between the clusters. Another example of a fluid can include proppant concentration. In some instances, the fracture can be injected with clean fluid, and then through the latter half of the fracture, sand can be pumped at a progressive ramp into the wellbore. The progressive ramp can include progressively pumping a density fluid into the wellbore. In other examples, increasing proppant concentration throughout the duration of the treatment can also impact the overall cost or cluster efficiency 618. A second surface variable can include controlling proppant concentration, while a third surface variable can include the use of diverters, which is generally some form of material that can be pumped into the wellbore with the aim of plugging off of perforations inside the casing and/or outside the casing. A fourth surface variable can be related to rheology, in particular, the viscosity of the fluid can also have an impact on cluster efficiency 618.

In some implementations, a fiber optic line can be utilized to measure the flow of fluids at each of the cluster perforations. Other parameters that can be measured include the rate, density, and pressure of the fluid flowing through the clusters of perforations. This data can then be provided and utilized by artificial intelligence agent 610 to select corresponding or appropriate completion plans based on changing parameters relating to cluster efficiency 618. Data or information relating to cluster efficiency 618 can be updated in real time and provided to artificial intelligence agent 610 to update completion plans for fracturing system 600.

During pumping of various fluids including proppant or sand, data from fiber optic lines provided information relating to altering sand concentrations when a problem occurs near the clusters of perforations. In some instances, adjusting the ramp of sand is one option to combat the rapid change in sand concentration. Additionally, altering the viscosity of the fluid (e.g., running a higher viscosity and/or higher sand concentrations) can help transport the proppant of the wellbore, e.g., higher concentrations of the wellbore.

In some implementations, the artificial intelligence 610 of fracturing system 600 can receive data relating to cluster efficiency 618 including the number of clusters, the spacing of the clusters, and the total rate of fluid and the rate per cluster (e.g., rate of a fluid through the cluster). For example, relating to the last few perforations, when fluid is pumped downhole, these perforations may have the lowest rate (e.g., between the last two clusters of perforations). If the rate of fluid flow is insufficient, the proppant can screen off the last cluster. In response, artificial intelligence agent 610 can select a completion plan or adjust settings accordingly that change the viscosity or flow rate of the fluid. Perforation erosion is also a concern relating to cluster efficiency. For example, if the fluid flow rate is too large, a cluster of perforations can erode at a high rate and become uncontrollable. Prior to the cluster of perforations becoming eroded too quickly and hard to control, the fluid flow can be redistributed more evenly with the use of diverters. In some instances, based on the data relating to cluster efficiency 618, artificial intelligence agent 610 can determine that certain clusters of perforations are eroding too quickly, and in response, artificial intelligence agent 610 can select a completion plan or adjust settings accordingly to route the fluid using diverters, adjust flow rate, and/or adjust viscosity of the fluid.

In other implementations, hole size of the perforations of the clusters may not be uniform between each perforation or between each cluster of perforations, which may affect cluster efficiency 618. For example, if one perforation is larger than the rest, it will begin taking more of the fluid that can have a critical impact on when the erosion occurs. Also, perforation orientation (e.g., vertical versus down) can affect cluster efficiency 618. For example, downward facing perforations tend to erode faster than the ones that are more in the vertical or upward facing position. This may be due to sand concentrations in low viscosity fluids. In some instances, fracturing system 600 can be agnostic of the size of the perforations, however, it may be beneficial to know the size and number of perforations and clusters of perforations to adjust parameters accordingly with artificial intelligence agent 610.

In some instances, artificial intelligence agent 610 of fracturing system 600 can include determining which surface variables to control based on input data 611 including data relating to cluster efficiency 618 that can provide effective concentrations and rheology of the fluid. Artificial intelligence agent 610 can train and retrain models that select completion plans based on various objective functions including providing efficient cluster perforation flow. Artificial intelligence agent 610 of fracturing system 600 can also weigh different objective functions including increasing cluster efficiency 618 when determining which completion plans to utilizing in the fracturing system 600.

Referring to FIG. 6B, an example of cluster efficiency 618 relating to fluid distribution (%) versus various stages 672 of clusters 680 is shown. For example, data relating to cluster efficiency 618 can include target fluid distribution 670. Fluid distribution 670 can include an amount of slurry that can be expected to flow out of a single cluster 680 of perforations if the split was equal across every cluster 680 in a stage 672. In some instances, each stage 672 can include one or more clusters of perforations 680. For example, FIG. 6B illustrates a plurality of stages 672 (e.g., Stage 1 to Stage 22) and their corresponding fluid distribution percentages 670. In this instance, Stage 1 is illustrated as including 4 clusters of perforations, while Stage 22 is illustrated as including 8 clusters of perforations. A varying number of stages and clusters of perforations 680 are contemplated in the present disclosure and that is understood by a person of ordinary skill in the art. Moreover, fluid distribution 670 is shown as a percentage in FIG. 6B. However, other values of fluid distribution 670 such as speed, consistency, density, index, etc. are contemplated in the present disclosure as understood by a person of ordinary skill in the art.

Various windows of target fluid distribution 674, 676, 678 are also shown in FIG. 6B. For example, an on-target window 676 can include a plus or minus 20% fluid distribution target. In FIG. 6B, on-target window 676 of Stage 1 includes a 5% plus or minus distribution, while on-target window 676 of Stage 22 includes a 2.5% plus or minus distribution. An over-target window 674 can include clusters of perforations with a fluid distribution percentage that is greater than 20% of a target. In FIG. 6B, over-target window 674 of Stage 1 includes a 20% distribution over the maximum of on-target window 676 of Stage 1, while over-target window 674 of Stage 22 includes a 10% distribution over the maximum of on-target window 676 of Stage 22. Clusters of perforations that have a fluid distribution percentage that is greater than 20% can also be considered to be over-target or over-stimulated. Clusters of perforations with a fluid distribution less than 20% of a target can be considered to be under-target or under-stimulated. In FIG. 6B, under-target window 6378 of Stage 1 includes a 20% distribution under the minimum of on-target window 676 of Stage 1, while under-target window 678 of Stage 22 includes a 10% distribution under the minimum of on-target window 676 of Stage 22.

In some instances, the fluid distribution target can be pre-selected or predetermined by the fracturing system 600 or the artificial intelligence agent 610 of fracturing system 600. For example, in Stage 1, the target fluid distribution percentage that is targeted is 25%, while in Stage 22, the target fluid distribution percentage that is target is 12.5%. Various fluid distribution percentages can be targeted based on selections made by users, artificial intelligence agent 610, or fracturing system 600. For example, as shown in FIG. 6B, cluster 1 of Stage 1 is within the on-target window 676, cluster 3 of Stage 1 is within the over-target window 674, and clusters 2 and 4 are within the under-target window 678. For Stage 22, clusters 2-4, 6, and 7 are within the on-target window 676, cluster 5 is within the over-target window 674, and clusters 1 and 8 are within the under-target window 678.

In some implementations, different metrics can be utilized to assess evenness of fluid distribution to determine cluster efficiency 618 of fracturing system 600. For example, as provided below, cluster efficiency (CE) 618 can be a summation of a number of clusters with fluid allocation in an on-target window 676 and over-target window 674 divided by a total number of clusters in a stage:

$$CE = \left(\frac{\text{number of clusters on target} + \text{number of clusters over target}}{\text{total number of clusters in a stage}}\right) \times 100.$$

Major fractures within a subterranean formation can include clusters 680 that have flow distribution percentages that are either in on-target window 676 or over-target window 674. Cluster efficiency 618 of fracturing system 600 can further include information relating to fracture density. For example, fracture density can be the number of fractures per 1,000 feet of lateral. In some instances, fracture density per stage can be determined by multiplying the number of major fractures by 1,000 feet and dividing the total by the stage length, as provided below:

$$\text{Fracture Density} = \left(\frac{\text{number of major fractures} \times 1000}{\text{stage length}}\right).$$

Referring to FIG. 6C, cluster efficiency 618 of fracturing system 600 can include information relating to uniformity index (UI) of clusters 680. For example, uniformity index can be a statistical metric that can be utilized to evaluate the evenness of fluid volume distribution between clusters of perforations 680. For example, uniformity index can be described by the following equation:

$$\text{Uniformity Index} = 1 - \left(\frac{\sigma}{\overline{X}}\right).$$

σ can be a standard deviation of σ volume distribution between clusters of perforations 680. $\overline{X}$ can be the mean of fluid distribution between clusters of perforations 680, which can be equal to 1/cluster count or a fluid distribution percentage between clusters of perforations 680.

Cluster efficiency 618 of fracturing system 600 can further include information and data relating to initial uniformity index 686 and final uniformity index 688 as shown in a graph as represented in FIG. 6C. For example, FIG. 6C is shown as providing corresponding uniformity index percentages 682 at various times 684 of the fracturing process. Measurement of initial uniformity index 686 can be taken before the start of providing proppant to the well, while measurement of final uniformity index 688 can be taken during the flushing process of fracturing system 600. In FIG. 6C, initial uniformity index 686 is shown as having an 81% value at approximate time 79, while final uniformity index 688 is shown as having a 74% value at approximate time 205. Cluster efficiency 618 can further include data relating to an average uniformity index. For example, uniformity index can be averaged over the course of a stage that can then be used to evaluate fluid distribution behavior for the entirety of the stage.

Wellbore interference can include data related to interference that may be encountered by neighboring wellbores. For example, if one wellbore pumps an excess amount of proppant into a subterranean cavity, the excess proppant may flow into a designated area of a neighboring wellbore, thereby affecting the efficiency of the neighboring wellbore. Complexity can include data related to the effects of cluster efficiency 618, wellbore interference, and any other data suitable for the intended purpose and understood by a person of ordinary skill in the art. In some instances, set point data 611 can be received via communication interfaces (e.g., wired and/or wireless) for communicating set point data 611 to other devices such as artificial intelligence agent 610, advisor 620, controller 622, and/or any other device.

Internal data 612 can include applicable data related to subterranean formations, fracture completions, and/or hydrocarbon extractions that is measured and/or maintained by an entity responsible for performing the fracture completion job. For example, internal data 612 can include geological data at well sites of past fracture completion jobs. In some instances, internal data 612 can be specific to a client of an entity responsible for performing the fracture completion job. Furthermore, internal data 612 can be maintained across a plurality of different clients by an entity responsible for performing the fracture completion job. In some instances, internal data 612 can be received via communication interfaces (e.g., wired and/or wireless) for communicating internal data 612 to other devices such as artificial intelligence agent 610, advisor 620, controller 622, and/or any other device.

Client/customer fracturing data 613 can include applicable client data related to subterranean formations, fracture completions, and/or hydrocarbon extractions. For example, customer fracturing data 613 can include geologic data of a fracture job site of an oil and gas production company. In another example, customer fracturing data 613 can include all or a portion of a target completion of the fracture completion job. Customer fracturing data 613 can also indicate that an oil and gas production company desires fractures that can extend into a specific hydrocarbon reservoir at horizontal intervals of every 20 feet. In some instances, customer fracturing data 613 can further include geological and geophysical (G&G) data that can be utilized by artificial intelligence agent 610 in fracturing operations. In some instances, customer fracturing data 613 can be received via communication interfaces (e.g., wired and/or wireless) for communicating customer fracturing data 613 to other devices such as artificial intelligence agent 610, advisor 620, controller 622, and/or any other device.

Well survey data can include applicable data (e.g., geographical data including fracturing shape 614, pressure data 615, and fracturing growth 616), related to wells at a site of the current fracture completion jobs. For example, well survey data can include a physical profile of a wellbore at the current fracture completion job. Well survey data can further be maintained by a customer (e.g., an oil and gas production company) or an entity responsible for performing the fracture completion job. Examples of fracturing shape 614 include length, height, width, and azimuth. Pressure data 615 can include data driven proxy models that can provide fracture information. Fracturing growth 616 can include data relating to perforation flow, fracturing velocity, asymmetry of the fracture, complexity of the fracturing job, and any other fracturing growth data suitable for the intended purpose and understood by a person of ordinary skill in the art. In some instances, well survey data can be received via communication interfaces (e.g., wired and/or wireless) for communicating well survey data to other devices such as artificial intelligence agent 610, advisor 620, controller 622, and/or any other device.

Pressure data 615 can include proxy-type models that can be generated to evaluate different options and actions, which is faster and more efficient than having to generate and re-run full models. The proxy-type models can also be generated based on data received from a treatment well (e.g., treatment well 712 of FIG. 7) and pressure data received from offset monitor wells (e.g., offset wells 710 of FIG. 7). The proxy-type models can also be utilized to determine a more probable fracture response based on data collected by fracturing system 600.

In some implementations, fracturing completion models 650 can be applied to interpret gathered diagnostic data by the sensors 640. For example, the fracturing completion models 650 can be applied to transform the diagnostics data into a form that is more readily interpretable by the AI agent 610. Further, the fracturing completion models 650 can be applied to identify a plurality of possible fracturing completion plans for performing the fracture completion job. For example, fracturing completion model 650 can be applied to identify a plurality of possible fracturing completion plans for performing the fracture completion job at a target completion (e.g., a target completion of a client/customer). The possible fracturing completion plans identified through fracturing completion model 650 can have varying values of fracturing completion and reservoir parameters (e.g., uncertainty parameters for the fracturing completion model). For example, fracturing completion model 650 can vary different fracturing completion and reservoir parameters in order to identify a plurality of possible fracturing completion plans for achieving the target completion. In some instances, the possible fracturing completion plans utilized by fracturing completion model 650 can have varying proppant ramp characteristics to achieve the target completion. In another instance, the possible fracturing completion plans can have varying fluid pumping times during fracturing stages to achieve the target completion.

Fracturing system 600 can further include identifying the plurality of possible fracturing completion plans based on data related to the wellbore and the surrounding subterranean area. In some instances, fracturing completion model 650 can also identify subsurface fracture simulations corresponding to each of the plurality of possible fracturing completion plans. A subsurface fracture simulation (e.g., by artificial intelligence agent 610) can include a simulated representation of fracture creation and stabilization/possible outcomes in one or more wellbores when a specific fracturing completion plan is performed. For example, fracturing completion model 650 can utilize a possible fracturing completion plan, as structured input, to generate a corresponding subsurface fracture simulation, as structured output. Fracturing completion model 650 can also generate subsurface fracture simulations for each of the identified possible fracturing completion and reservoir parameters. Subsequently, and as discussed herein, the subsurface fracture simulations generated by artificial intelligence agent 610 can be utilized to select fracturing completion models 650 from the plurality of possible fracturing completion plans.

Fracturing completion model 650 can also be an applicable geomechanical fracture simulator for identifying possible fracturing completion plans by varying values of fracturing completion and reservoir parameters. For example, fracturing completion model 650 can be an applicable geomechanical fracture simulator for identifying subsurface fracture simulations for a possible fracturing completion plans. In some instances, subterranean simulation tools such as GOHFER® can be utilized to identify a plurality of possible fracturing completion plans and generate corresponding subsurface fracture simulations for the different possible fracturing completion plans. Furthermore, fracturing completion model 650 can identify possible fracturing completion plans and corresponding subsurface fracture simulations using one or a combination of the public data, set point data 611, customer fracturing data 613, internal fracturing data 612, and the well survey data (e.g., fracturing shape 614, pressure data 615, and fracturing growth data 616) gathered for the fracture completion job.

Fracturing completion model 650 of fracturing system 600 can further include utilizing subterranean data such as that received from a distributed acoustic sensing (DAS) fiber optic cable 652, and interpreting low frequency pressure data 654 and high frequency pressure data 656. Examples of data received from a DAS fiber optic cable 652 can include flow rate, microseismic monitoring (MSM), and strain of the fracturing process. In some implementations, interpretations from low frequency pressure data 654 can include determining and/or utilizing a minimal amount of stress experienced by fracturing system 600, flow area, and pore volume (e.g., of a reservoir characteristic). In other instances, interpretations from high frequency pressure data 656 can include determining and/or utilizing RLC (e.g., high frequency analysis), a wavelet analysis technique, Fourier transforms, moving references, and compressional/primary wave (p-wave) velocity.

Fracturing completion model 650 of fracturing system 600 can further simulate fracturing completion plans to identify subsurface fracture simulations using a subsurface fracture grid. For example, a subsurface fracture grid can be a simulated physical grid within a subterranean formation of the fracturing completion job. In some instances, a subsurface fracture grid can be a simulated physical grid of the subterranean formation that physically quantifies fractures that are formed according to different fracturing completion plans. In turn, fracturing completion model 650 can utilize the subsurface fracture grid to simulate the possible fracturing completion plans and generate subsurface fracture simulations.

Fracturing system 600 can further include utilizing advisor 620 and controller 622 upon selection of a fracturing completion plan by artificial intelligence agent 610. In some instances, advisor 620 of fracturing system 600 can be an open loop where the fracturing completion plan selected by artificial intelligence agent 610 is outputted 660 to a fracturing site or operator. For example, once a fracturing completion plan is selected by artificial intelligence agent 610, the selected fracturing completion plan can be directly outputted 660 to the fracturing site or operator along with environment data 630 and unknown disturbances 632. Fracturing data 624 (e.g., flow rate, concentration, rheology, and diverter information) can further be outputted 660 along with the fracturing completion plan selected by artificial intelligence agent 610.

In other instances, controller 622 of fracturing system 600 can be a closed loop where the fracturing system 600 further receives fracturing data 624 (e.g., flow rate, concentration, rheology, and diverter information) that can then be received by artificial intelligence agent 610 to determine whether to maintain or change the selected fracturing completion plan. For example, once a fracturing completion plan is selected by artificial intelligence agent 610, artificial intelligence agent 610 can subsequently receive fracturing data 624 in real time and update or maintain the fracturing completion plan outputted 660 to fracturing system 600. Fracturing data 624 can further be outputted 660 along with the fracturing completion plan selected by artificial intelligence agent 610. In some implementations, artificial intelligence agent 610 can continuously receive and consider fracturing data 624 received by controller 622 to determine how to proceed with fracturing completion plans utilized by fracturing system 600.

In some implementations, the possible fracturing completion plans and the corresponding subsurface fracture simulations of fracturing system 600 can be provided to a fracturing decision engine 617. In some instances, fracturing decision engine 617 can include artificial intelligence agent 610. The fracturing decision engine 617 can use the possible fracturing completion plans and the corresponding subsurface fracture simulations to identify a fracturing completion plan to apply in performing the fracture completion job by fracturing system 600. For example, the fracturing decision engine 617 can select a fracturing completion plan to apply in achieving the target completion based on the possible fracturing completion plans and the corresponding subsurface fracture simulations.

The fracturing decision engine 617 can select the fracturing completion plan from the plurality of possible fracturing completion plans through machine learning and/or artificial intelligence (e.g., artificial intelligence agent 610). The fracturing decision engine 617 can use an applicable machine learning and/or artificial intelligence technique, e.g., one or more completion plan selection model(s) based on the above-mentioned fracturing data and parameters, to select the fracturing completion plan from the plurality of possible fracturing completion plans. For example, artificial intelligence agent 610 can use machine learning and/or artificial intelligence, e.g., a completion plan selection model, to select the fracturing completion plan for achieving the target completion in the one or more wellbores during the fracture completion job. In some instances, artificial intelligence agent 610 can use machine learning and/or artificial intelligence to select the fracturing completion plan from the possible fracturing completion plans based on a predicted accuracy of the fracturing completion plan in achieving the target completion and measured data and parameters of the fracturing activity. Furthermore, in the example, artificial intelligence agent 610 can use artificial intelligence and machine learning to predict accuracies of each of the possible fracturing completion plans in achieving the target completion, e.g., based on similarities between the target completion and subsurface fracture simulations of the fracturing completion plans. As described herein, artificial intelligence agent 610 can select a possible fracturing completion plan that can be predicted to most accurately achieve the target completion.

In some implementations, the selected fracturing completion plan can be an initial fracturing completion plan. For example, the selected fracturing completion plan can be the first fracturing completion plan that is implemented to start the fracture completion job, which may be selected by artificial intelligence agent 610. The initial fracturing completion plan can be selected based on a predicted accuracy of the fracturing completion plan in achieving the target completion, e.g., based on similarities between the subsurface fracture simulation of the fracturing completion plan and the target completion. The initial fracturing completion plan can also be selected by artificial intelligence agent 610 without completion characteristic data of the fracture completion job, e.g., before fracture completion operations are actually carried out to generate the completion characteristic data.

Furthermore, the fracturing completion plan of fracturing system 600 can be a new/replacement fracturing completion plan that can be implemented to replace a current fracturing completion plan in performing the fracture completion job. For example, artificial intelligence agent 610 can select the new fracturing completion plan while the current fracturing completion plan is performed. As described herein, the fracturing completion job can be performed by fracturing system 600 according to the new fracturing completion plan, effectively switching fracturing completion plans based on past and/or current data measured from sensors 640 or provided by set point data 611, internal fracturing data 612, customer fracturing data 613, fracturing shape data 614, fracturing pressure data 615, and fracturing growth data 616. The new fracturing completion plan can be selected and implemented by artificial intelligence agent 610 to accurately achieve the target completion. For example, the current fracturing completion plan can be causing screen outs during the fracture completion job leading to failed realization of the target completion. As described herein, the new fracturing completion plan can be selected and implemented by artificial intelligence agent 610 to reduce screen out occurrences and more closely realize the target completion.

In other instances, artificial intelligence agent 610 of fracturing system 600 can determine whether to select the new fracturing completion plan from the plurality of possible fracturing completion plans through application of machine learning and/or artificial intelligence, e.g., through application of a completion plan selection model. For example, artificial intelligence agent 610 can determine whether to select a new completion plan and subsequently select the new fracturing completion plan based on performance characteristics of the currently implemented fracturing completion plan. In some instances, artificial intelligence agent 610 can determine deficiencies of the current fracturing completion plan from completion characteristics data, including surface and subsurface diagnostics data (e.g., including past, current, and/or updated set point data 611, internal fracturing data 612, customer fracturing data 613, fracturing shape data 614, fracturing pressure data 615, and fracturing growth data 616, environment data 630, and sensor data 640), for the current fracturing completion plan. Environment data 630 can include unknown disturbances 632 detected at environment 630 such as at the wellbore or surrounding subterranean region. As described herein, artificial intelligence agent 610 can determine to switch to a new fracturing completion plan and subsequently select the new fracturing completion plan based on the completion characteristics data for the current fracturing completion plan. For example, if subsurface diagnostics data indicates that a screen out is occurring, then artificial intelligence agent 610 of fracturing system 600 can select a new fracturing completion plan, e.g., a plan that adds a viscosifier to reduce the chances of screen out occurrence.

In other instances, artificial intelligence agent 610 can apply machine learning and/or artificial intelligence to the completion characteristics data to select a fracturing completion plan, e.g., an initial fracturing completion plan or a replacement fracturing completion plan, from the plurality of possible fracturing completion plans. For example, artificial intelligence agent 610 can apply a completion plan selection model that is trained and/or retrained through artificial intelligence and/or machine learning based on the surface diagnostics data and the subsurface diagnostics data (e.g., including past, current, and/or updated set point data 611, internal fracturing data 612, customer fracturing data 613, fracturing shape data 614, fracturing pressure data 615, and fracturing growth data 616, environment data 630, and sensor data 640) to select a fracturing completion plan from the plurality of possible fracturing completion plans. For example, artificial intelligence agent 610 can apply a completion plan selection model to the completion characteristics data to recognize deficiencies in the current fracturing completion plan. As described herein, artificial intelligence agent 610 can also use the completion plan selection model to select the new fracturing completion plan while accounting for the large number of fracturing completion and reservoir parameters that form the possible fracturing completion plans.

A completion plan selection model can map events, both unfavorable events and favorable events (e.g., including environment data 630 and unknown disturbances 632), occurring in a fracture completion to values of fracturing completion and reservoir parameters, e.g., values of parameters that form a fracture completion plan. Furthermore, a completion plan selection model can map events, both unfavorable events and favorable events, occurring in a fracture completion to completion characteristics data, e.g., either or both subsurface and surface diagnostics data. For example, artificial intelligence agent 610 can recognize an occurrence of a runaway fracture by applying machine learning and/or artificial intelligence to subsurface pressures included in subsurface diagnostics data. Furthermore, in the example, artificial intelligence agent 610 can apply the completion plan selection model to diagnose that a diverter material should to be added during a fracturing stage to account for runaway fractures. As described herein, artificial intelligence agent 610 can select a new fracturing completion plan that adds diverter material during the fracturing stage based on application of the completion plan selection model.

Using machine learning and/or artificial intelligence to select a fracturing completion plane, e.g., a new fracturing completion plan, is advantageous as a human is unable to timely analyze the wealth of completion characteristic data (e.g., including past, current, and/or updated set point data 611, internal fracturing data 612, customer fracturing data 613, fracturing shape data 614, fracturing pressure data 615, and fracturing growth data 616, environment data 630, and sensor data 640). For example, a human is unable to timely analyze the wealth of completion characteristics data to determine whether to apply a new fracturing completion plan. Furthermore, using machine learning and/or artificial intelligence to select a new fracturing completion plan is advantageous as a human is unable to analyze the large number of fracturing completion parameters and/or reservoir parameters for selecting the new fracturing completion plan.

These advantages are further realized when fracturing is performed on multiple wellbores and potentially simultaneously on the multiple wellbores. For example, fracturing on multiple wellbores simultaneously can increase the number of fracturing completion parameters and/or reservoir parameters that need to be accounted for and the complexity of the fracturing completion parameters and the reservoir parameters that should be accounted for in selecting a fracturing completion plan, e.g., a new fracturing completion plan. Applying machine learning and/or artificial intelligence by artificial intelligence agent 610 can insure that the numerous and complex fracturing completion and reservoir parameters present in a multi-wellbore fracturing job are properly accounted for in selecting a new fracturing completion plan by fracturing system 600.

In some implementations, once a fracturing completion plan is selected by fracturing system 600 from the plurality of possible fracturing completion plans, fracturing system 600 can include facilitating performance of a fracture completion job according to a selected fracturing completion plan. In facilitating implementation of the selected fracturing completion plan, one or more alerts, e.g., actionable alerts, can be presented to an operator for implementing the fracture completion job. For example, an alert can be presented that instructs an operator to increase a concentration of proppant. Furthermore, in facilitating implementation of the selected fracturing completion plan, fracturing system 600 can perform the fracturing job to implement the fracturing completion plan. In some instances, fracturing system 600 can provide instructions for implementing the selected fracturing completion plan and autonomously controlling the instructions to implement the selected fracturing completion plan.

In facilitating performance of the fracture completion job according to the selected fracturing completion plan, fracturing system 600 can include facilitating switching to the new fracturing completion plan for completing the one or more wellbores. For example, alerts for implementing, or otherwise switching to the new fracturing completion plan, can be presented to an operator. Subsequently, the operator can use the alerts to control fracturing system 600 according to the new fracturing completion plan. Furthermore, fracturing system 600 can include instructions for implementing the new fracturing completion plan can be provided to the fracturing system 600. Fracturing system 600 can also then autonomously control itself to operate according to the instructions and implement the new fracturing completion plan.

Either or both surface diagnostics data and subsurface diagnostics data (e.g., including past, current, and/or updated set point data 611, internal fracturing data 612, customer fracturing data 613, fracturing shape data 614, fracturing pressure data 615, and fracturing growth data 616, environment data 630, and sensor data 640) can be utilized to train/retrain the fracturing completion model by fracturing system 600. In turn, the trained/retrained fracturing completion model can be used to generate a plurality of possible fracturing completion plans. For example, the trained/retrained fracturing completion model can be used to generate corresponding subsurface fracturing simulations for each of the possible fracturing completion plans. As described herein, the plurality of possible fracturing completion plans and corresponding subsurface fracturing simulations can be analyzed (e.g., based on artificial intelligence agent 610) to select a fracture completion plan (e.g., an initial fracturing completion plan or a changed fracturing completion plan), to implement in performing a fracture completion job. The trained/retrained fracturing completion model can be applied to one or a plurality of different fracturing completion jobs from the fracturing completion job by fracturing system 600.

Furthermore, either or both surface diagnostics data and subsurface diagnostics data (e.g., including past, current, and/or updated set point data 611, internal fracturing data 612, customer fracturing data 613, fracturing shape data 614, fracturing pressure data 615, and fracturing growth data 616, environment data 630, and sensor data 640) can be used to train/retrain the completion plan selection model by fracturing system 600. In turn, the trained/retrained completion plan selection model can be used to select a new fracture completion plan from the plurality of fracture completion plans for the fracturing completion job. The trained/retrained completion plan selection model can be applied to one or a plurality of different fracturing completion jobs from the fracturing completion job by fracturing system 600.

In some implementations, the fracturing completion model and/or the completion plan selection model can be trained/retrained using parameters of the fracturing completion plans (e.g., values of varying fracturing completion parameters and/or reservoir parameters), which can be applied to formulate the different fracturing completion plans. For example, values of parameters of the applied fracturing completion plans can be correlated with the completion characteristics data based on times that the applied fracturing completion plans are implemented and times that the completion characteristics data are generated. This can ensure that the completion characteristics data is accurately associated with values of fracturing completion and reservoir parameters of completion plans that were used to generate the completion characteristics data. As described herein, the fracturing completion model and/or the completion plan selection model of fracturing system 600 can be trained/retrained with the completion characteristics data and corresponding values of the fracturing completion and reservoir parameters used in generating the completion characteristics data.

Furthermore, the fracturing completion model and/or the completion plan selection model of fracturing system 600 can be trained/retrained based on specific events occurring during the fracturing completion job. For example, an occurrence of an event can be correlated with values of fracturing completion and reservoir parameters at the time the event occurred. Subsequently, the fracturing completion model and/or the completion plan selection model of fracturing system 600 can be trained/retrained based on the values of the fracturing completion and reservoir parameters correlated with the specific event. In some instances, a runaway fracture can be detected during the fracturing completion job. Furthermore, in the example, the values of fracturing completion and reservoir parameters that caused the runway fracture can be correlated with the runaway fracture. For example, a flow rate of proppant slurry and fluid that led to the runaway fracture can be correlated with an occurrence of the runaway fracture. In turn, the fracturing completion model and/or the completion plan selection model of fracturing system 600 can be trained/retrained based on the values of the fracturing completion and reservoir parameters that led to the runaway fracture.

While the description has made reference to performing fracturing jobs as part of well completion activities by fracturing system 600, the techniques and systems described herein can be applied to any applicable situation where a fracturing job is performed. Specifically, the techniques and systems for performing a fracturing job, as described herein, can be applied to perform well workover activities. For example, the techniques and systems described herein can be applied in well workover activities to change a completion based on changing hydrocarbon reservoir conditions. In another example, the techniques and systems described herein can be applied in well workover activities to pull and replace a defective completion.

Figure 7:
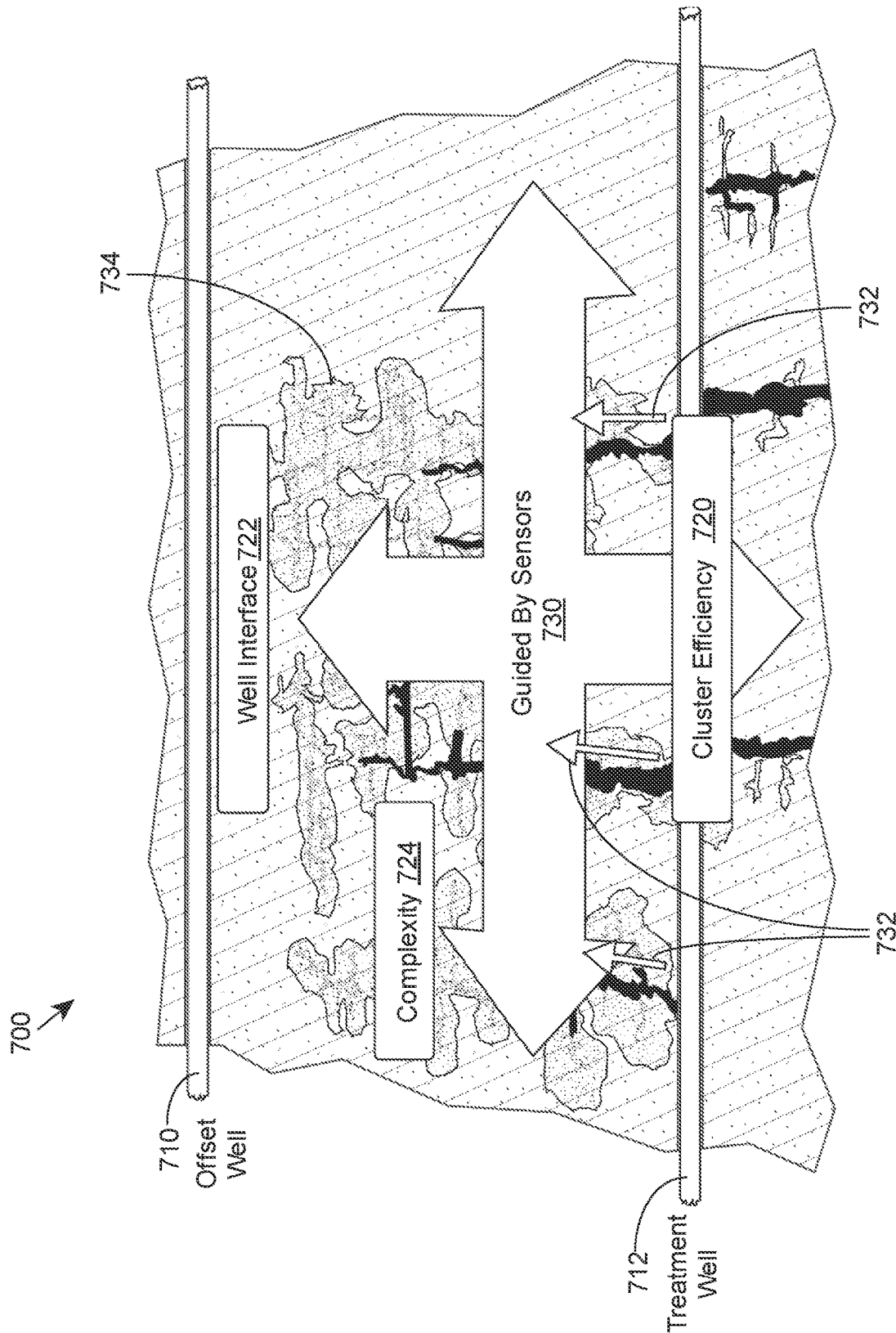
FIG. 7 shows an example fracturing operation utilizing set points, in accordance with various aspects of the subject technology.

FIG. 7 shows an example fracturing operation 700 utilizing set point data such as data related to cluster efficiency 720, wellbore interference 722, and complexity of a wellbore site 724 (e.g., the surrounding subterranean region between neighboring wellbores 710, 712). Fracturing operation 700 can utilize fracturing system 600 and its corresponding components, elements, and structure, as described herein. For example, cluster efficiency 720 of fracturing operation 700 is similar to cluster efficiency 618 of set points 611 of fracturing system 600. Wellbore interference 722 of fracturing operation 700 is similar to wellbore interference of set points 611 of fracturing system 600. Complexity 724 of fracturing operation 700 is similar to complexity of set points 611 of fracturing system 600.

Fracturing operation 700 can include sensors 730 that are distributed throughout subterranean formation 734 surrounding the offset well 710 and the treatment well 712. Sensors 730 can further be distributed within an interior region or adjacent to the offset well 710 and/or the treatment well 712. Sensors 730 can further gather data from subterranean formation 734 that can then be utilized by fracturing operation 700 and fracturing system 600 to determine which fracturing completion model to select and utilize.

In some implementations, cluster efficiency 720 may be illustrated by arrows 732 as shown in FIG. 7. The length of arrows 732 may represent the efficiency of perforation clusters of fracturing operation 700. For example, longer arrows 732 can represent higher cluster efficiency 720, while shorter arrows 732 can represent lower cluster efficiency 720. As described herein, as wellbores 710, 712 undergo fracturing procedures, circumstances may arise where perforation clusters become clogged or inoperable. In such cases, where actionable, inefficient/inoperable perforation clusters are discontinued or operations are conducted to liberate the clogged perforations/perforation clusters.

Fracturing operation 700 further illustrates interactions between offset well 710 and treatment well 712. For example, as treatment well 712 injects proppant into subterranean formation 734, the injected proppant can interfere with proppant injected by offset well 710. The interference potentially created between offset well 710 and treatment well 712 can deteriorate efficiency and performance of one or both wellbores 710, 712.

In some instances, the combination of cluster efficiency 720 and wellbore interference 722 along with the subterranean formation 734 attributes to the complexity 724 of fracturing operation 700. The totality of the circumstances within wellbores 710, 712 (e.g., cluster efficiency 720) and surrounding wellbores 710, 712 (e.g., wellbore interference 722) establishes variations in complexity 724 of fracturing operation 700 that attribute to selection of fracturing completion models by artificial intelligence agent 610 of fracturing system 600 as shown in FIG. 6A.

Figure 8:
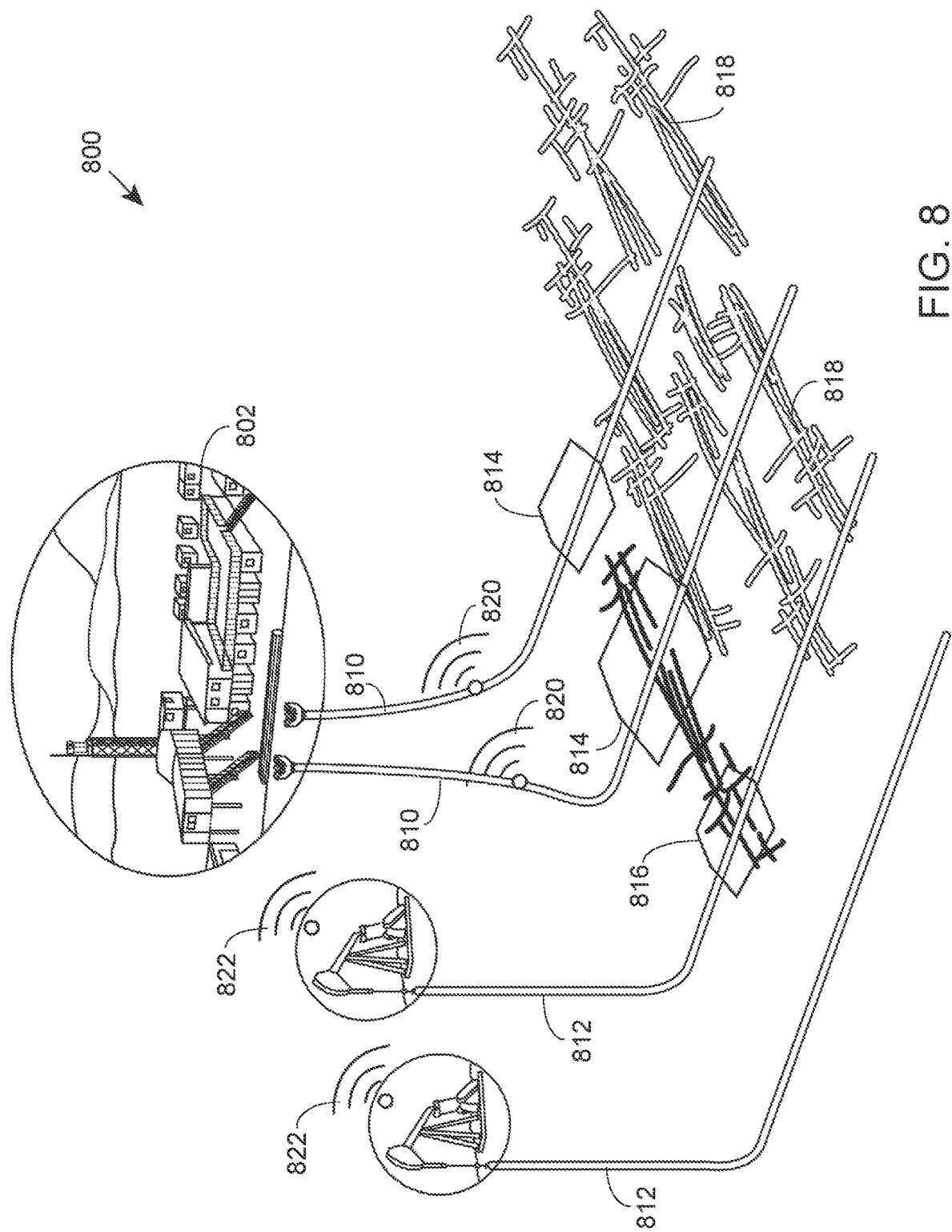
FIG. 8 shows an example fracturing operation with multiple wellbores and respective fracturing interactions between the multiple wellbores, in accordance with various aspects of the subject technology.

FIG. 8 shows an example fracturing operation 800 with multiple wellbores 810, 812 and respective fracturing interactions between the multiple wellbores 810, 812. Multiple wellbores 810, 812 of fracturing operation 800 are similar to wellbores 710, 712 of fracturing operation 700 as described herein. In some instances, well survey data from wellbores 810, 812 can be received via communication interfaces (e.g., wired and/or wireless 820, 822) for communicating data from wellbores 810, 812 to other devices such as artificial intelligence agent 610, advisor 620, controller 622, fracturing site 802, and/or any other device as described in fracturing system 600 and as shown in FIG. 6A. In other instances, communication interface 822 can provide information received from pressure gauges distributed at or throughout wellbore 812, while communication interface 820 can provide information received from a fiber optic cable (e.g., distributed acoustic sensing fiber optic cable) installed within, around, or on wellbore 810.

Fracturing operation 800 of FIG. 8 further illustrates zones of perforation clusters 814, 816 of wellbores 810, 812, respectively. The zones of perforation clusters 814, 816 illustrate a general region of the subterranean formation that proppant is expected to flow from wellbores 810, 812. As described herein, as zones of perforation clusters 814 of wellbore 810 draw closer to zones of perforation 816 of wellbore 812, interference can be experienced by wellbores 810, 812, thereby deteriorating the quality of fracturing operation of wellbores 810, 812 of fracturing operation 800. FIG. 8 further illustrates fracturing lines 818 of wellbores 810 throughout the subterranean formation.

Figure 9:
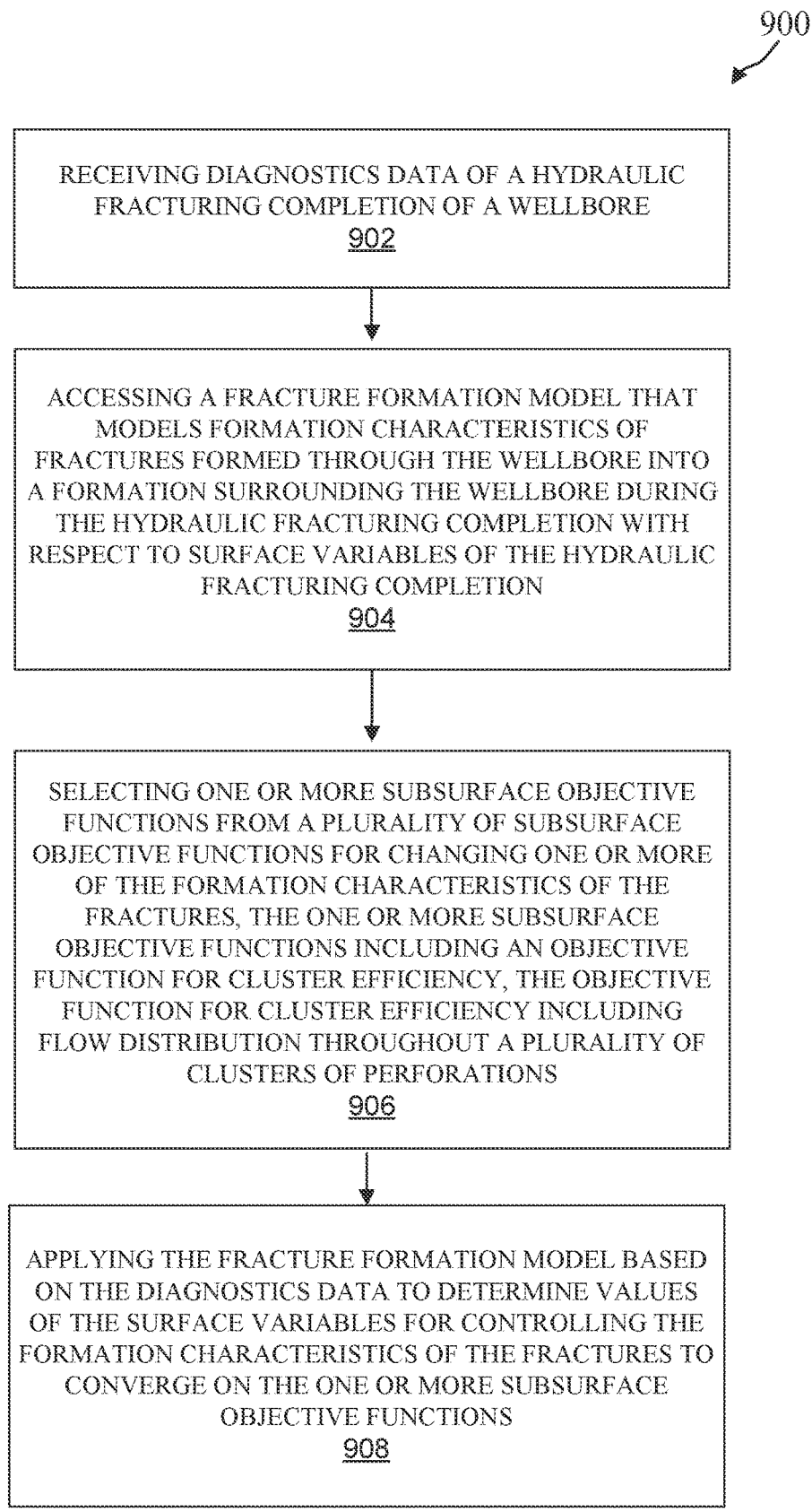
FIG. 9 shows an example process for controlling a fracturing completion job, in accordance with various aspects of the subject technology.

Having disclosed some example system components and concepts, the disclosure now turns to FIG. 9, which illustrate example method 900 for controlling a fracturing completion job. The steps outlined herein are exemplary and can be implemented in any combination thereof, including combinations that exclude, add, or modify certain steps.

At step 902, the method 900 can include receiving diagnostics data of a hydraulic fracturing completion of a wellbore. The diagnostics data received at step 902 can include applicable diagnostics data gathered during the wellbore completion. Specifically, the diagnostics data received at step 902 can include applicable subsurface data gathered during the wellbore completion.

At step 904, the method 900 can include accessing a fracture formation model that models formation characteristics of fractures formed through the wellbore into a formation surrounding the wellbore during the hydraulic fracturing completion with respect to surface variables of the hydraulic fracturing completion. The formation characteristics can include either or both subsurface fracture geometry of the fractures during formation and growth behavior of the fractures during formation.

Surface variables of the hydraulic fracturing completion that are modeled by the fracture formation model can include applicable variables of the hydraulic fracturing completion that can be modified at the surface of the wellbore. For example, surface variables can include a pressure of a fluid or slurry pumped into the wellbore during the fracturing completion. Further, surface variables of the hydraulic fracturing completion can include variables that are modified at the surface and effectively implemented at the subsurface, e.g. at or through the wellbore. Specifically, surface variables of the hydraulic fracturing completion can include characteristics of a perforation plan that can be modified or otherwise selected at the surface. In turn, the perforation plan can be implemented at the subsurface based on the characteristics of the perforation plan selected at the surface. For example, the fracture formation model can model a number of perforations clusters selected as part of a perforation plan at the surface, which can then be implemented to form a selected number of perforation clusters subsurface.

At step 906, the method 900 can include selecting one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations. A subsurface objective function is a real-valued function with a value that is associated with one or more applicable subsurface characteristics of the hydraulic fracturing completion. Specifically, a subsurface object function can include a real-valued function of one or more characteristics of either or both fracture growth behaviors and fracture geometries during the hydraulic fracturing completion. The value of the real-valued function can either be maximized or minimized over a set of values of one or more applicable surface variables associated with the hydraulic fracturing completion.

A value of a subsurface objective function can include actual subsurface attributes associated with subsurface characteristics. For example, a subsurface objective function can include an objective function for fracture complexity, an objective function for cluster efficiency, or an objective function for well interference. Further, a value of a subsurface objective function can include actual surface attributes associated with subsurface characteristics. For example, a subsurface objective function can include an objective function for one or more surface costs associated with changing one or more of the formation characteristics of the fractures during the hydraulic fracturing completion.

In some instances, the selecting of the one or more subsurface objective functions can include assigning varying weights to each of the one or more subsurface objective functions. Specifically, the selecting of the one or more subsurface objective functions can include assigning a weight to at least one of the one or more subsurface objective functions that is greater than a corresponding weight assigned to each other subsurface objective function of the plurality of subsurface objective functions. For example, when minimizing well interference during the hydraulic fracturing completion, an objective function for well interference can be weighted greater than objective functions for cluster efficiency and fracture complexity.

At step 908, the method 900 can include applying the fracture formation model based on the diagnostics data to determine values of the surface variables for controlling the formation characteristics of the fractures to converge on the one or more subsurface objective functions.

In some instances, the method 900 can further include forming a completion plan for performing the hydraulic fracturing completion of the wellbore based on the values of the surface variables. The method 900 can also include facilitating implementation of the completion plan in performing the hydraulic fracturing completion of the wellbore. The completion plan can be a modified completion plan formed by modifying a previous completion plan for the hydraulic fracturing completion based on the values of one or more of the surface variables.

In other instances, the method 900 can further include modifying the surface variables based on the fracture formation model applied according to the diagnostics data to converge on the one or more subsurface objective functions including the objective function for cluster efficiency. For example, each of the plurality of subsurface objective functions can include a corresponding weight assigned to the plurality of subsurface objective functions including a weight assigned to the objective function for cluster efficiency, the modifying of the surface variables being further based on the corresponding weight assigned to the plurality of subsurface objective functions. In some implementations, the flow distribution throughout the plurality of clusters of perforations can be viewed on a per cluster basis and across each of the plurality of clusters of perforations.

In some implementations, the method 900 can further include maximizing the objective function of cluster efficiency to converge the flow distribution throughout the plurality of clusters of perforations towards a uniform flow distribution. The flow distribution can include a flow rate of each cluster of the plurality of clusters of perforations.

In other implementations, the method 900 can further include forming a completion plan for performing the hydraulic fracturing completion of the wellbore based on the values of the surface variables, the completion plan being a modified completion plan formed by modifying a previous completion plan for the hydraulic fracturing completion based on the values of one or more of the surface variables.

Figure 10:
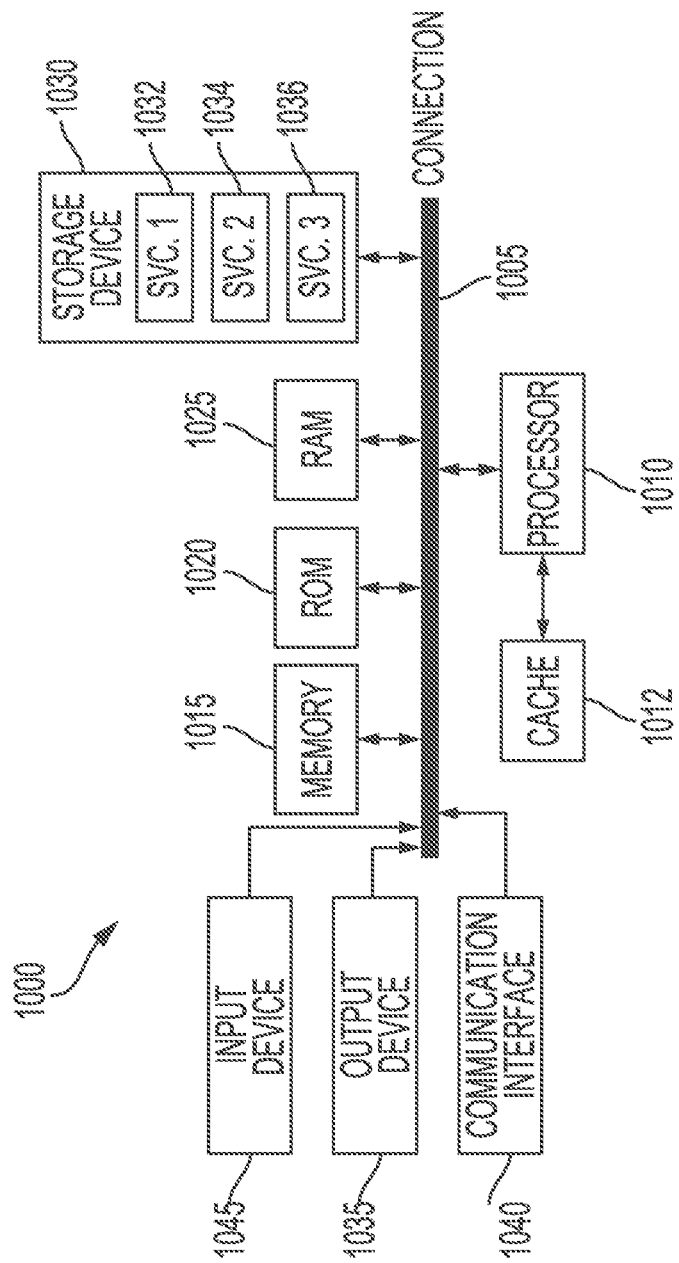
FIG. 10 shows an example computing device architecture which can be employed to perform various steps, methods, and techniques disclosed herein.

FIG. 10 illustrates an example computing device architecture 1000 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 10 illustrates an example computing device architecture 1000 of a computing device which can implement the various technologies and techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graal input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising: receiving diagnostics data of a hydraulic fracturing completion of a wellbore; accessing a fracture formation model that models formation characteristics of fractures formed through the wellbore into a formation surrounding the wellbore during the hydraulic fracturing completion with respect to surface variables of the hydraulic fracturing completion; selecting one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations; and applying the fracture formation model based on the diagnostics data to determine values of the surface variables for controlling the formation characteristics of the fractures to converge on the one or more subsurface objective functions.

Statement 2: A method according to Statement 1, further comprising modifying the surface variables based on the fracture formation model applied according to the diagnostics data to converge on the one or more subsurface objective functions including the objective function for cluster efficiency.

Statement 3: A method according to any of Statements 1 and 2, wherein each of the plurality of subsurface objective functions includes a corresponding weight assigned to the plurality of subsurface objective functions including a weight assigned to the objective function for cluster efficiency, the modifying of the surface variables being further based on the corresponding weight assigned to the plurality of subsurface objective functions.

Statement 4: A method according to any of Statements 1 through 3, wherein the flow distribution throughout the plurality of clusters of perforations is viewed on a per cluster basis and across each of the plurality of clusters of perforations.

Statement 5: A method according to any of Statements 1 through 4, further comprising maximizing the objective function of cluster efficiency to converge the flow distribution throughout the plurality of clusters of perforations towards a uniform flow distribution.

Statement 6: A method according to any of Statements 1 through 5, wherein the flow distribution includes a flow rate of each cluster of the plurality of clusters of perforations.

Statement 7: A method according to any of Statements 1 through 6, further comprising forming a completion plan for performing the hydraulic fracturing completion of the wellbore based on the values of the surface variables, the completion plan being a modified completion plan formed by modifying a previous completion plan for the hydraulic fracturing completion based on the values of one or more of the surface variables.

Statement 8: A system comprising: one or more processors; and at least one computer-readable storage medium having stored therein instructions which, when executed by the one or more processors, cause the system to: receive diagnostics data of a hydraulic fracturing completion of a wellbore; access a fracture formation model that models formation characteristics of fractures formed through the wellbore into a formation surrounding the wellbore during the hydraulic fracturing completion with respect to surface variables of the hydraulic fracturing completion; select one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations; and apply the fracture formation model based on the diagnostics data to determine values of the surface variables for controlling the formation characteristics of the fractures to converge on the one or more subsurface objective functions.

Statement 9: A system according to Statement 8, wherein the instructions which, when executed by the one or more processors, cause the system to modify the surface variables based on the fracture formation model applied according to the diagnostics data to converge on the one or more subsurface objective functions including the objective function for cluster efficiency.

Statement 10: A system according to any of Statements 8 and 9, wherein each of the plurality of subsurface objective functions includes a corresponding weight assigned to the plurality of subsurface objective functions including a weight assigned to the objective function for cluster efficiency, the modification of the surface variables being further based on the corresponding weight assigned to the plurality of subsurface objective functions.

Statement 11: A system according to any of Statements 8 through 10, wherein the flow distribution throughout the plurality of clusters of perforations is viewed on a per cluster basis and across each of the plurality of clusters of perforations.

Statement 12: A system according to any of Statements 8 through 11, wherein the instructions which, when executed by the one or more processors, cause the system to maximize the objective function of cluster efficiency to converge the flow distribution throughout the plurality of clusters of perforations towards a uniform flow distribution.

Statement 13: A system according to any of Statements 8 through 12, wherein the flow distribution includes a flow rate of each cluster of the plurality of clusters of perforations.

Statement 14: A system according to any of Statements 8 through 13, wherein the instructions which, when executed by the one or more processors, cause the system to form a completion plan for performing the hydraulic fracturing completion of the wellbore based on the values of the surface variables, the completion plan being a modified completion plan formed by modifying a previous completion plan for the hydraulic fracturing completion based on the values of one or more of the surface variables.

Statement 15: A non-transitory computer-readable storage medium comprising: instructions stored on the non-transitory computer-readable storage medium, the instructions, when executed by one or more processors, cause the one or more processors to: receive diagnostics data of a hydraulic fracturing completion of a wellbore; access a fracture formation model that models formation characteristics of fractures formed through the wellbore into a formation surrounding the wellbore during the hydraulic fracturing completion with respect to surface variables of the hydraulic fracturing completion; select one or more subsurface objective functions from a plurality of subsurface objective functions for changing one or more of the formation characteristics of the fractures, the one or more subsurface objective functions including an objective function for cluster efficiency, the objective function for cluster efficiency including flow distribution throughout a plurality of clusters of perforations; and apply the fracture formation model based on the diagnostics data to determine values of the surface variables for controlling the formation characteristics of the fractures to converge on the one or more subsurface objective functions.

Statement 16: A non-transitory computer-readable storage medium according to Statement 15, wherein the instructions, when executed by the one or more processors, cause the one or more processors to modify the surface variables based on the fracture formation model applied according to the diagnostics data to converge on the one or more subsurface objective functions including the objective function for cluster efficiency.

Statement 17: A non-transitory computer-readable storage medium according to any of Statements 15 and 16, wherein each of the plurality of subsurface objective functions includes a corresponding weight assigned to the plurality of subsurface objective functions including a weight assigned to the objective function for cluster efficiency, the modification of the surface variables being further based on the corresponding weight assigned to the plurality of subsurface objective functions.

Statement 18: A non-transitory computer-readable storage medium according to any of Statements 15 through 17, wherein the flow distribution throughout the plurality of clusters of perforations is viewed on a per cluster basis and across each of the plurality of clusters of perforations.

Statement 19: A non-transitory computer-readable storage medium according to any of Statements 15 through 18, wherein the instructions, when executed by the one or more processors, cause the one or more processors to maximize the objective function of cluster efficiency to converge the flow distribution throughout the plurality of clusters of perforations towards a uniform flow distribution.

Statement 20: A non-transitory computer-readable storage medium according to any of Statements 15 through 20, wherein the flow distribution includes a flow rate of each cluster of the plurality of clusters of perforations.

What is claimed is:

1. A method for completing a hydraulic fracturing operation of a wellbore, the method comprising:
   initiating a hydraulic fracturing plan that includes one or more surface variables of the hydraulic fracturing operation;
   receiving diagnostics data of the hydraulic fracturing operation of the wellbore;
   accessing a fracture formation model that models formation characteristics of fractures formed according to the hydraulic fracturing plan through the wellbore into a formation surrounding the wellbore during the hydraulic fracturing operation with respect to the one or more surface variables of the hydraulic fracturing operation;
   selecting one or more subsurface objective functions from a plurality of subsurface objective functions for changing one or more of the formation characteristics of the fractures, the one or more subsurface objective functions including an objective function for cluster efficiency, the objective function for cluster efficiency including a number of clusters that have an on-target flow distribution throughout a plurality of clusters of perforations within a clustering stage and a number of clusters that have an over target flow relative to a total number of the clusters of perforations in the clustering stage;
   maximizing the objective function for cluster efficiency by:
      generating a sum by adding the number of clusters that have the on-target flow distribution to the number of clusters that have the over target flow, and
      dividing the sum by the total number of the clusters of perforations in the clustering stage; and
   applying the fracture formation model to update the hydraulic fracturing plan based on the diagnostics data to determine values of the one or more surface variables for controlling the formation characteristics of the fractures to converge on the one or more subsurface objective functions as the fractures are formed according to the updated hydraulic fracturing plan.

2. The method of claim 1, further comprising modifying the one or more surface variables based on the fracture formation model applied according to the diagnostics data to converge on the one or more subsurface objective functions including the objective function for cluster efficiency.

3. The method of claim 2, wherein each of the plurality of subsurface objective functions includes a corresponding assigned weight including a weight assigned to the objective function for cluster efficiency, the modifying of the one or more surface variables being further based on the corresponding weight assigned to each of the plurality of subsurface objective functions.

4. The method of claim 1, wherein the flow distribution throughout the plurality of clusters of perforations is viewed on a per cluster basis.

5. The method of claim 1, wherein respective flow rates of each cluster of the plurality of clusters of perforations are uniform.

6. A system for competing a hydraulic fracturing operation of a wellbore, the system comprising:
   one or more processors; and
   at least one computer-readable storage medium having stored therein instructions which, when executed by the one or more processors, cause the system to:
      initiate a hydraulic fracturing plan that includes one or more surface variables of the hydraulic fracturing operation;
      receive diagnostics data of the hydraulic fracturing operation of the wellbore;
      access a fracture formation model that models formation characteristics of fractures formed according to the hydraulic fracturing plan through the wellbore into a formation surrounding the wellbore during the hydraulic fracturing operation with respect to the one or more surface variables of the hydraulic fracturing operation;
      select one or more subsurface objective functions from a plurality of subsurface objective functions for changing one or more of the formation characteristics of the fractures, the one or more subsurface objective functions including an objective function for cluster efficiency, the objective function for cluster efficiency including a number of clusters that have an on-target flow distribution throughout a plurality of clusters of perforations within a clustering stage and a number of clusters that have an over target flow relative to a total number of the clusters of perforations in the clustering stage;
      maximizing the objective function for cluster efficiency by:
         generating a sum by adding the number of clusters that have the on-target flow distribution to the number of clusters that have the over target flow, and
         dividing the sum by the total number of the clusters of perforations in the clustering stage; and
      apply the fracture formation model to update the hydraulic fracturing plan based on the diagnostics data to determine values of the one or more surface variables for controlling the formation characteristics of the fractures to converge on the one or more subsurface objective functions as the fractures are formed according to the updated hydraulic fracturing plan.

7. The system of claim 6, wherein the instructions which, when executed by the one or more processors, cause the system to modify the one or more surface variables based on the fracture formation model applied according to the diagnostics data to converge on the one or more subsurface objective functions including the objective function for cluster efficiency.

8. The system of claim 7, wherein each of the plurality of subsurface objective functions includes a corresponding assigned including a weight assigned to the objective function for cluster efficiency, the modification of the one or more surface variables being further based on the corresponding weight assigned to each of the plurality of subsurface objective functions.

9. The system of claim 6, wherein the flow distribution throughout the plurality of clusters of perforations is viewed on a per cluster basis.

10. The system of claim 6, wherein respective flow rates of each cluster of the plurality of clusters of perforations are uniform.

11. A non-transitory computer-readable storage medium for implementing a method for completing a hydraulic fracturing operation of a wellbore, the method comprising:

instructions stored on the non-transitory computer-readable storage medium, the instructions, when executed by one or more processors, cause the one or more processors to:
- initiate a hydraulic fracturing plan that includes one or more surface variables of the hydraulic fracturing operation;
- receive diagnostics data of the hydraulic fracturing operation of the wellbore;
- access a fracture formation model that models formation characteristics of fractures formed according to the hydraulic fracturing plan through the wellbore into a formation surrounding the wellbore during the hydraulic fracturing operation with respect to the one or more surface variables of the hydraulic fracturing operation;
- select one or more subsurface objective functions from a plurality of subsurface objective functions for changing one or more of the formation characteristics of the fractures, the one or more subsurface objective functions including an objective function for cluster efficiency, the objective function for cluster efficiency including a number of clusters that have an on-target flow distribution throughout a plurality of clusters of perforations within a clustering stage and a number of clusters that have an over target flow relative to a total number of the clusters of perforations in the clustering stage;
- maximizing the objective function for cluster efficiency by:
  - generating a sum by adding the number of clusters that have the on-target flow distribution to the number of clusters that have the over target flow, and
  - dividing the sum by the total number of the clusters of perforations in the clustering stage; and
- apply the fracture formation model to update the hydraulic fracturing plan based on the diagnostics data to determine values of the one or more surface variables for controlling the formation characteristics of the fractures to converge on the one or more subsurface objective functions as the fractures are formed according to the updated hydraulic fracturing plan.

12. The non-transitory computer-readable storage medium of claim 11, wherein the instructions, when executed by the one or more processors, cause the one or more processors to modify the one or more surface variables based on the fracture formation model applied according to the diagnostics data to converge on the one or more subsurface objective functions including the objective function for cluster efficiency.

13. The non-transitory computer-readable storage medium of claim 12, wherein each of the plurality of subsurface objective functions includes a corresponding assigned weight including a weight assigned to the objective function for cluster efficiency, the modification of the one or more surface variables being further based on the corresponding weight assigned to each of the plurality of subsurface objective functions.

14. The non-transitory computer-readable storage medium of claim 11, wherein the flow distribution throughout the plurality of clusters of perforations is viewed on a per cluster basis.

15. The non-transitory computer-readable storage medium of claim 11, wherein respective flow rates of each cluster of the plurality of clusters of perforations are uniform.

* * * * *